United States Patent
Jonnala et al.

(10) Patent No.: US 7,551,559 B1
(45) Date of Patent: Jun. 23, 2009

(54) SYSTEM AND METHOD FOR PERFORMING SECURITY ACTIONS FOR INTER-LAYER BINDING PROTOCOL TRAFFIC

(75) Inventors: Premkumar Jonnala, Santa Clara, CA (US); Adam J. Sweeney, Sunnyvale, CA (US); Dehua Huang, Fremont, CA (US); Silviu Dobrota, San Jose, CA (US); Pradeep S. Sudame, Fremont, CA (US); Marco E. Foschiano, To (IT)

(73) Assignee: Cisco Technology, Inc., San Jose, CA (US)

( * ) Notice: Subject to any disclaimer, the term of this patent is extended or adjusted under 35 U.S.C. 154(b) by 929 days.

(21) Appl. No.: 10/971,521

(22) Filed: Oct. 22, 2004

(51) Int. Cl.
*H04L 5/12* (2006.01)
(52) U.S. Cl. ...................... 370/230; 370/389
(58) Field of Classification Search .............. 370/389, 370/230, 235, 216, 373, 377, 386, 391, 401, 370/232, 273
See application file for complete search history.

(56) References Cited

U.S. PATENT DOCUMENTS

| | | | |
|---|---|---|---|
| 7,346,057 B2 * | 3/2008 | Foschiano et al. | 370/392 |
| 7,434,254 B1 | 10/2008 | Foschiano et al. | 726/13 |
| 2004/0022253 A1 | 2/2004 | Foschiano et al. | 370/395.54 |
| 2008/0151887 A1 * | 6/2008 | Foschiano et al. | 370/389 |

OTHER PUBLICATIONS

Cisco IOS Software Release 12.1 (19) EW for the Cisco Catalyst 4500 Series Supervisor Engines II-Plus, III, and IV, Jun. 23, 2003.

Chapter 34, *Understanding And Configuring Dynamic ARP Inspection*, Cisco Catalyst 4500 Series Switch Cisco IOS Software Configuration Guide—12.1(19)EW, pp. 31-1 thru 31-10, Jun. 23, 2003.

Huang et al., pending U. S. Patent Application entitled "System And Method for Maintaining Protocol Status Information In Network Device," U.S. Appl. No. 10/654,388, filed Sep. 3, 2003, including Specification, Claims & Abstract: 40 pages, and Drawings: Figures 1-6.

Huang et al., pending U. S. Patent Application entitled "System And Method for Filtering Network Traffic," U.S. Appl. No. 10/971,523, filed Oct. 22, 2004, including Specification, Claims & Abstract: 49 pages, and Drawings: Figures 1-10.

* cited by examiner

*Primary Examiner*—Brenda Pham
(74) *Attorney, Agent, or Firm*—Campbell Stephenson LLP; Brenna A. Brock

(57) ABSTRACT

Users are allowed to specify per-interface rate limits for inter-layer binding protocol traffic. If the user-specified rate limit is exceeded on a given interface, inter-layer binding protocol messages received via that interface are caused to be dropped (e.g., by selectively dropping ILBP messages, or by simply shutting down the interface). If the rate is not exceeded, inter-layer binding protocol messages received via that interface can be validated (e.g., by comparing an inter-layer binding included in the body of an inter-layer binding protocol message to protocol status information obtained by snooping protocol messages). If the inter-layer binding does not match the protocol status information, the inter-layer binding protocol message is dropped. If a match is found, the inter-layer binding protocol message is allowed to be forwarded normally. Such systems and methods may be used to inhibit various undesirable network behavior, such as man-in-the-middle attacks.

42 Claims, 14 Drawing Sheets

SYSTEM AND METHOD FOR PERFORMING SECURITY ACTIONS FOR INTER-LAYER BINDING PROTOCOL TRAFFIC

FIELD OF THE INVENTION

The present invention relates to networking and, more specifically, to network devices that convey inter-layer binding protocol messages.

BACKGROUND

Various network protocols are used to provide networking services to devices. One type of network protocol includes Inter-Layer Binding Protocols (ILBPs). An ILBP is a protocol that is used to inform network devices and clients of the binding between network addresses at different networking layers. For example, an ILBP can be used to convey information indicating a binding between an Open Systems Interconnection (OSI) Layer 2 (L2) network address and an OSI Layer 3 (L3) network address. Address Resolution Protocol (ARP) is an ILBP that is used to inform network devices and clients of the binding between a Media Access Control (MAC) address (which is an example of an L2 network address) and an Internet Protocol (IP) address (which is an example of an L3 network address). Another example of an ILBP is Neighbor Discovery (ND), which is used with Internet Protocol version 6 (IPv6).

Typically, ARP is used the first time that a first client wants to communicate with a second client on the network, the first client sends an ARP request containing the IP address of the second client. The second client will send an ARP reply that includes the MAC address and IP address of the second client, creating a binding between the IP address and the MAC address.

It is possible for a third client to craft and send an unsolicited, fake ARP reply to the first client in the above scenario. This fake ARP reply will specify that the third client has the IP address of the second client, but will specify the MAC address of the third client, creating a binding between the IP address of the second client and the MAC address of the third client. Any network devices and/or clients that receive the fake ARP reply may update an ARP cache to indicate that a binding exists between the IP address of the second client and the MAC address of the third client. The information in the ARP cache is used when determining the destination MAC address to use for a message having the IP address of the second client as its destination IP address. As a result, messages sent from the first client to the second client will be erroneously delivered to the third client, since the third client has represented itself as having the intended IP address.

The third client knows the true IP address and MAC address of the second client. Accordingly, after inspecting the messages that are erroneously delivered to the third client, the third client can resend those messages to the second client. Since the messages are still being received by the second client, the presence of the third client in the message stream may be hidden from the first and second clients. This scenario illustrates what is referred to as a "man in the middle" attack.

Another security risk that can occur with an ILBP such as ARP occurs when a malicious (or malfunctioning) client or network device sends a high rate of ARP messages on the network. The high rate of ARP messages may overwhelm the resources of a network device, causing that network device to malfunction or to cease operation. As these examples show, techniques for handling security risks involving ILBP traffic are desired.

SUMMARY

Various embodiments of systems and methods for performing security actions for inter-layer binding protocol traffic are disclosed. In some embodiments, users are allowed to specify per-interface rate limits for inter-layer binding protocol traffic. If the user-specified rate limit is exceeded on a given interface, inter-layer binding protocol messages received via that interface are caused to be dropped (e.g., by selectively dropping ILBP messages, or by simply shutting down the interface). If the rate is not exceeded, inter-layer binding protocol messages received via that interface can be validated. In one embodiment, an inter-layer binding protocol message is validated by comparing an inter-layer binding included in the body of an inter-layer binding protocol message to protocol status information obtained by snooping protocol messages (protocol messages are messages that are sent according to a protocol that is used to assign a network address to a client). If the inter-layer binding does not match the protocol status information, the inter-layer binding protocol message is dropped. If a match is found, the inter-layer binding protocol message is allowed to be forwarded normally. Such systems and methods may be used to inhibit various undesirable network behavior, such as man-in-the-middle attacks.

In some embodiments, a method involves: receiving user input specifying an Inter-Layer Binding Protocol (ILBP) rate for a first interface; detecting a rate of ILBP messages received via the first interface; and dropping an ILBP message received via the first interface, if the rate exceeds the ILBP rate specified by the user input. The method can also involve validating the ILBP message received via the first interface, if the rate does not exceed the ILBP rate, and dropping the ILBP message if the ILBP message is invalid.

The method can also involve generating protocol status information, in response to one or more protocol messages. The protocol messages are conveyed according to a protocol used to assign network addresses to clients.

The body of the ILBP message includes an inter-layer binding. Validating the ILBP message involves comparing the inter-layer binding to the protocol status information. The validation of an ILBP message can be performed in response to ILBP configuration information, which identifies that ILBP validation is enabled for a first Virtual Local Area Network (VLAN) on which the ILBP message is being conveyed.

In some embodiments, a network device includes an Inter-Layer Binding Protocol (ILBP) rate-limiting module and rate-limit storage coupled to the rate-limiting module. The rate-limit storage is configured to store a user-specified rate, in response to user input specifying the user-specified rate. The ILBP rate-limiting module is configured to drop an ILBP message if a rate of ILBP messages received via a first interface exceeds the user-specified rate. The ILBP rate-limiting module is part of the first interface in one embodiment.

The rate-limit storage is configured to store a default rate, if no user input specifying the user-specified rate has been received. The ILBP rate-limiting module is configured to drop the ILBP message in response to the rate of ILBP messages received via the first interface exceeding the default rate and the first interface being configured as one of one or more untrusted interfaces.

An ILBP security agent is coupled to the first interface. The ILBP security agent is configured to validate the ILBP message, if the ILBP message is not dropped by the ILBP rate-limiting module. The ILBP security agent is configured to drop the ILBP message in response to detecting that the ILBP message is invalid.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
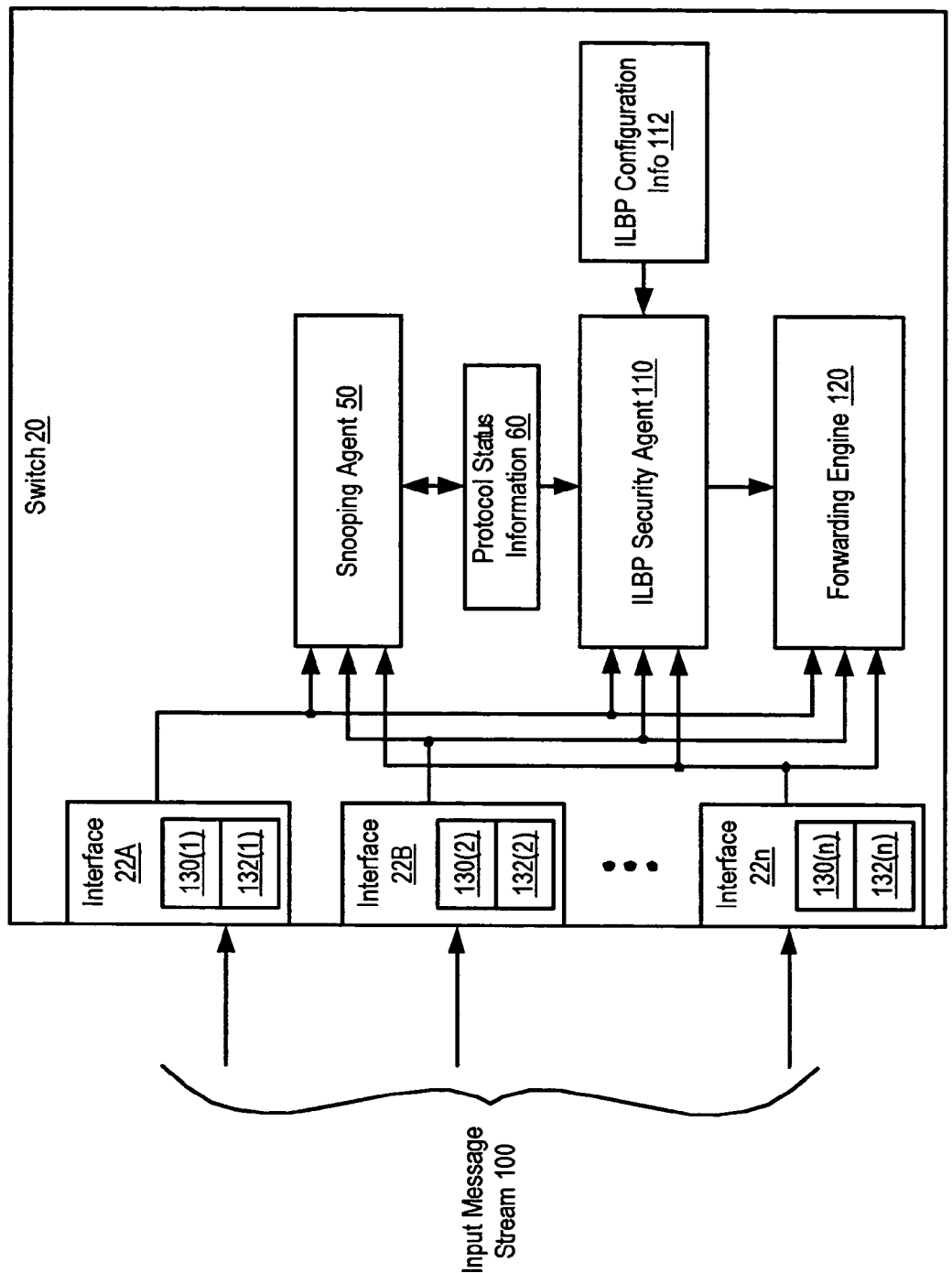
FIG. 1 illustrates an example of a switch that is configured to provide security for inter-layer binding protocol (ILBP) traffic, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The following sets forth a detailed description of at least the best contemplated mode for implementing the devices and/or processes described herein. The description is intended to be illustrative and should not be taken to be limiting.

Providing Security for ILBP Traffic

A network device can perform security actions for inter-layer binding protocol traffic. The security actions can include rate-limiting ILBP messages received via a particular interface and/or validating ILBP messages. In some embodiments, users are allowed to specify per-interface rate limits for inter-layer binding protocol traffic. If the user-specified rate limit is exceeded on a given interface, ILBP messages received via that interface are caused to be dropped (e.g., by selectively dropping ILBP messages received via that interface, or by simply shutting the interface down so that all messages sent to that interface will be dropped). If the rate is not exceeded, ILBP messages received via that interface can be validated. An ILBP message can be validated by comparing the inter-layer binding contained in the body of the ILBP message to information obtained by snooping network traffic (e.g., such as Dynamic Host Configuration Protocol (DHCP) traffic.

These security actions can be used to inhibit various undesirable network behavior, such as man-in-the-middle attacks. For example, if a malicious client sends an invalid ILBP message (e.g., such a message can be sent if the malicious client is attempting to initiate a man-in-the-middle attack by linking another client's IP address with the malicious client's MAC address), the invalid ILBP message will be detected when the network device attempts to validate the invalid ILBP message. In response to identifying that the ILBP message is invalid, the network device can drop the invalid ILBP message, effectively thwarting the man-in-the-middle attack.

In one embodiment, an inter-layer binding protocol message is validated by comparing an inter-layer binding included in the body of an inter-layer binding protocol message to protocol status information obtained by snooping protocol message (protocol messages are messages that are sent according to a protocol that is used to assign a network address to a client). If the inter-layer binding does not match the protocol status information, the inter-layer binding protocol message is dropped. If a match is found, the inter-layer binding protocol message is allowed to be forwarded normally.

FIG. 1 illustrates an example of a switch that is configured to provide security for inter-layer binding protocol (ILBP) traffic. Switch 20 is provided as an example of a network device that performs security actions for ILBP traffic. Other types of network devices include routers, bridges, and the like.

As shown, switch 20 includes several interfaces 22A-22n, as well as snooping agent 50, protocol status information 60, ILBP security agent 110, ILBP configuration information (info) 112, and forwarding engine 120. Input messages in input message stream 100 are received via interfaces 22A-22n. Control processing for those messages is provided by (at least) snooping agent 50 and ILBP security agent 110. Forwarding engine 120 determines how to forward messages.

Each interface 22A-22n can be a logical interface (e.g., implemented using EtherChannel) or physical interface. As shown by the arrows, information associated with and/or included in each message received via interfaces 22A-22n can be provided to snooping agent 50, ILBP security agent 110, and/or forwarding engine 120 (the messages themselves may be temporarily stored in buffers until the messages are ultimately output from switch 20 or dropped). Interfaces 22A-22n can be subdivided among several different line cards (e.g., each line card can include 10 interfaces)

Each interface 22A-22n includes a respective one of rate-limiting modules 130(1)-130(n) (collectively referred to as rate-limiting modules 130). Each interface 22A-22n also includes a respective rate-limit storage module 132(1)-132(n) (collectively referred to as rate-limit storage modules 132). As shown, interface 22A includes rate-limiting module 130(1) and rate-limit storage module 132(1), interface 22B includes rate-limiting module 130(2) and rate-limit storage module 132(2), and interface 22n includes rate-limiting module 130(n) and rate-limit storage module 132(n). Each rate-limiting module 130(1)-130(n) is configured to detect the current rate (e.g., number of ILBP messages per second) of ILBP messages that is being received via the interface in which the rate-limiting module is included.

Each rate-limiting module 130 is also configured to begin causing ILBP messages to be dropped if the current rate exceeds a rate limit, which is indicated by a value stored in an associated rate-limit storage module. For example, rate-limiting module 130(1) is configured to drop ILBP messages received via interface 22A if the rate of ILBP messages being received via interface 22A exceeds the rate identified by rate-limit storage module 132(1). Thus, rate-limiting module 130(1) can selectively cause ILBP messages received via interface 22A to be dropped (without necessarily causing other types of messages to be dropped). In one embodiment, all ILBP messages are dropped, while in other embodiments, only the portion of the ILBP messages that are exceeding the rate limit are dropped. Alternatively, rate-limiting module 130(1) causes all messages (ILBP and non-ILBP) that are conveyed in a particular VLAN (e.g., a VLAN in which the rate limit has been exceeded) to be dropped. Thus, rate-limiting module 130(1) can perform rate limiting for ILBP messages received via interface 22A on a per-VLAN basis. As yet another alternative, rate-limiting module 130(1) causes ILBP messages to be dropped by shutting down interface 22A, such that all messages conveyed to interface 22A will be dropped. In some embodiments, once a rate-limiting module begins causing ILBP messages (or all messages received via a particular VLAN and/or interface) to be dropped, that rate-limiting module continues to drop ILBP messages until an administrator intervenes (e.g., by resetting the rate-limiting module). The rate limit can vary among interfaces, and thus each rate-limit storage module 132(1) can store a different value.

In one embodiment, when switch 20 is powered on, each interface 22A-22n is assigned a default rate limit for ILBP messages. For example, when switch 20 is powered on, rate-limit storage modules 132(1)-132(n) can each be initialized to identify a rate limit of 15 ILBP messages per second. Switch 20 also provides a user interface via which users can specify the rate limit for each interface 22A-22n. In response to receiving user input specifying a particular rate limit for a particular interface, the rate-limit storage module at that particular interface is updated to store the user-specified rate limit (the rate-limit storage module can store the user-specified rate limit in addition to or instead of the default rate limit). For example, if a user specifies that a new rate limit of 20 ILBP messages per second is desired for interface 22B, rate-limit storage module 132(2) can be updated to store a value that identifies a rate limit of 20 ILBP messages per second. It is noted that a user can specify a rate limit using two variables: a number of messages and an interval of time (e.g., in seconds).

It is noted that a user can specify a rate limit that is higher or lower than the default rate. For example, if the user determines that a particular interface is unlikely to receive more than 5 ILBP messages per second during normal operation, the user can set the rate limit for that interface to 6 ILBP messages per second. Alternatively, if a particular interface is coupled to a hub that aggregates ILBP traffic from several clients, the rate of ILBP messages received via that interface during normal operation may be significantly higher than the default rate limit. Accordingly, in order to prevent erroneously dropping legitimate ILBP traffic, the user may increase the rate limit for that interface.

If a user-specified rate limit is available for a particular interface, the rate-limiting module for that interface will use the user-specified rate limit, instead of the default rate limit, to determine whether to begin dropping ILBP messages. Thus, if a user-specifies a rate limit for interface 22A, rate-limiting module 130(1) will use that user-specified rate to determine whether to drop ILBP messages received via interface 22A.

While the example of FIG. 1 shows how rate-limiting can be implemented at each interface (e.g., in an Application Specific Integrated Circuit (ASIC) at each interface, or in software executing on such an ASIC), it is noted that rate-limiting for ILBP messages can be performed differently in other embodiments. For example, in one embodiment, rate-limiting for ILBP messages is performed by ILBP security agent 110. Thus, rate-limiting for ILBP messages is consolidated in a single component within switch 20. Alternatively, rate-limiting for ILBP messages can be consolidated into a single location on each of several line cards. Snooping agent 50 is configured to generate and maintain protocol status information 60. Protocol status information 60 includes information obtained by snooping protocol (e.g., DHCP) messages. The protocol messages are conveyed according to a protocol, such as DHCP, that is used to assign network addresses to clients. By snooping the protocol messages, snooping agent 50 is able to dynamically identify certain aspects of the topology of the network that includes switch 20. For example, snooping agent 50 can detect a DHCP ACK message specifying a particular IP address. This message is sent from a DHCP server to a DHCP client in order to confirm the assignment of the particular IP address to the DHCP client. In response to the DHCP ACK message, snooping agent 50 can store information identifying the DHCP client's MAC address and IP address (as assigned by DHCP), as well as information identifying the interface and/or VLAN that switch 20 uses when communicating with the DHCP client, as part of protocol status information 60. The stored information creates an association between the IP address, MAC address, interface, and/or VLAN. Similarly, if snooping agent 50 detects a DHCP RELEASE message (indicating that an assigned IP address will no longer be used by a particular client), snooping agent 50 can delete information associating that IP address with a MAC address, interface, and/or VLAN.

More details regarding the operation of snooping agent 50 and the maintenance and use of protocol status information 60 are provided below, with respect to FIGS. 7, 8A, 8B, 8C, 9, 10A, 10B, and 11. It is noted that protocol status information 60 can also include information that has been entered by a user (e.g., a system or network administrator). For example, a network administrator can provide information to switch 20 in order to indicate that a client coupled to interface 22B has been assigned a particular IP address and MAC address. ILBP security agent 110 is configured to validate ILBP messages. For example, ILBP security agent 110 can be configured to verify all ARP messages (including ARP requests and replies). Alternatively, ILBP security agent 110 can be configured to verify one or more other types of ILBP messages (e.g., Neighbor Discovery messages, as used in Ipv6) in addition to and/or instead of ARP. Furthermore, for a given type of ILBP messages, ILBP security agent 110 can be configured to selectively validate only certain messages (e.g., only requests, as opposed to requests and replies). It is noted that the type of ILBP and/or messages to be validated can either be statically configured (e.g., in one embodiment, switch 20 only supports security actions for ARP traffic) or dynamically configured by an administrator. In embodiments that support dynamic configuration (e.g., if switch 20 supports security actions for more than one ILBP), a user can provide switch 20 with user input selecting one or more types of ILBP for which switch 20 should perform security actions. Information identifying the types of ILBP for which security actions are enabled can be stored in ILBP configuration information 112.

ILBP security agent 110 validates an ILBP message by comparing an inter-layer binding, which is contained in the body of the ILBP message, with protocol status information 60. For example, if the ILBP message includes an inter-layer binding between MAC address MACA and IP address IP2, ILBP security agent 110 will search protocol status information for information that associates MACA with IP2. If matching information is found, ILBP security agent 110 determines that the ILBP message is valid. If no matching information is found, ILBP security agent 110 determines that the ILBP message is invalid, since the ILBP message contains an inter-layer binding that does not match any inter-layer bindings that snooping agent 20 has detected by snooping protocol messages.

In one embodiment, as described in more detail below, protocol status information 60 is stored in a binding table (e.g., binding table 70 of FIG. 8C). Each entry in the binding table identifies an association between an IP address and a MAC address, as obtained by snooping one or more DHCP messages. Each entry can also associate an interface ID (i.e., information identifying one of interfaces 22A-22n) and a VLAN ID (i.e., information identifying a VLAN) with the IP address and MAC address in the entry. When ILBP security agent 110 validates an ILBP message, ILBP security agent 110 compares an inter-layer binding (which identifies an IP address and MAC address) in the body of the ILBP message to one or more of the entries in the binding table. If a matching entry (i.e., an entry that includes both the same IP address and the same MAC address) is found, ILBP security agent 110 determines that the ILBP message is valid.

In such embodiments, ILBP security agent 110 may not compare the inter-layer binding with all of the entries in the binding table. For example, if the ILBP message is being conveyed in VLAN Green, ILBP security agent 110 can compare the inter-layer binding in the ILBP message to entries in the binding table that specify VLAN Green. Binding table entries that specify other VLANs will not be compared to the inter-layer binding, however.

While FIG. 1 shows that ILBP security agent 110 uses protocol status information 60, which is dynamically generated by snooping agent 50, to validate ILBP messages, it is noted that other embodiments can use other information instead of and/or in addition to protocol status information 60 to validate ILBP messages. For example, in some embodiments, ILBP security agent 110 can also use user-specified network configuration information to validate ILBP messages. If user input indicates, for example, that IP address IP3 has been statically assigned to a device coupled to interface 22A and that the MAC address of that device is MACD, information identifying the binding between IP3 and MACD can be stored and used by ILBP security agent 110.

In one embodiment, ILBP security agent 110 can configure an access control rule (e.g., in an Access Control List (ACL)) in response to the user input indicating the binding between IP3 and MACD. This access control rule will filter ILBP messages that specify an inter-layer binding between IP3 and a MAC address. If one of the ILBP messages attempts to specify an inter-layer binding between IP3 and any MAC address other than MACD, application of the access control rule will cause that ILBP message to be dropped. In one embodiment, if both an access control rule and protocol status information are available for a particular inter-layer binding, the access control rule will determine whether the ILBP message containing that inter-layer binding is dropped. For example, if protocol status information 60 indicates a binding between IP3 and MACA, but an access control rule indicates that any ILBP message having that inter-layer binding should be dropped, an ILBP message that includes an inter-layer binding between IP3 and MACA will be dropped.

ILBP security agent 110 can also be configured to invalidate (and consequentially drop) an ILBP message if the IP addresses in the message's body and/or header are invalid. Similarly, ILBP security agent 110 can invalidate an ILBP message if the MAC addresses in the body of the ILBP message do not match the addresses specified in the Ethernet header of the ILBP message.

If ILBP security agent 110 determines that a message should be dropped, ILBP security agent 110 can cause the message to be deleted from a buffer in which the message is temporarily being stored. If ILBP security agent 110 determines that an ILBP message is valid, ILBP security agent 110 communicates information (e.g., to forwarding engine 120) indicating that the ILBP message should be forwarded normally (it is noted that the ILBP message may still be dropped by another component within switch 20, even if ILBP security agent 110 has validated the ILBP message).

If switch 20 includes an ILBP cache (e.g., an ARP cache, not shown in FIG. 1) that stores inter-layer bindings obtained from ILBP messages, ILBP security agent 110 can inhibit the ILBP cache from being updated based on invalid ILBP messages. For example, if ILBP security agent 110 determines that an ILBP message is invalid, ILBP security agent 110 can prevent the inter-layer binding contained in the invalid ILBP message from being used to update the ILBP cache. If ILBP security agent 110 determines that an ILBP message is valid, ILBP security agent 110 can allow the ILBP cache to be updated based on the valid ILBP message.

ILBP security agent 110 can selectively validate ILBP traffic, based on ILBP configuration information 112. For example, a user can configured ILBP security actions for some VLANs, but not for other VLANs. The user-specified configuration can be stored as ILBP configuration information 112. When ILBP security agent 110 receives information associated with a particular ILBP message, ILBP security agent 110 can access ILBP configuration information 112 in order to determine whether the ILBP message should be validated. For example, if the information associated with the ILBP message indicates that the message is being conveyed in VLAN Blue, and if ILBP configuration information 112 indicates that ILBP validation is not enabled on VLAN Blue, ILBP security agent 110 will not validate the ILBP message (instead, security agent 110 can do nothing and/or communicate information indicating that the ILBP message should be forwarded normally). Alternatively, if ILBP configuration information 112 indicates that ILBP validation is enabled on VLAN Blue, ILBP security agent 110 will proceed to validate the ILBP message, as described above.

ILBP configuration information 112 can also (or alternatively) identify two classes of interfaces: trusted and untrusted. ILBP configuration information 112 can indicate whether each interface 22A-22n is trusted or untrusted. In some embodiments, each interface is configured as an untrusted interface by default. A user can provide user input to switch 20 indicating whether a particular interface should be configured as a trusted interface.

Trusted interfaces are typically interfaces that are connected to other network devices, which are known to also be implementing ILBP security actions and/or are known to be unable to generate network attacks. For example, if interface 22A is coupled to another network device (e.g., a router or another switch), and if the other network device has also been configured to perform ILBP security actions, a user can provide switch 20 with user input indicating that interface 22A is a trusted interface. Since all ILBP messages received via a trusted interface are known to be valid, it would be waste of resources to validate those ILBP messages again. Accordingly, ILBP security agent 110 will not validate ILBP messages received via a trusted interface. Thus, if ILBP security agent receives information associated with an ILBP message received via interface 22A, and if ILBP configuration information 112 indicates that interface 22A is a trusted interface, ILBP security agent 110 will not attempt to validate the ILBP message. Untrusted interfaces are interfaces that are coupled to client devices (e.g., hosts), servers, network devices that are not known to be implementing ILBP security actions, and the like.

In some embodiments, different default rate limits are used for trusted and untrusted interfaces. For example, if switch 20 detects user input indicating that interface 22B is a trusted interface, switch 20 can update rate-limit storage module 132(2) to store a different default rate limit (assuming that no user-specified rate limit has already been received for interface 22B). In one embodiment, there is no default rate limit for trusted interfaces. Thus, if an interface is a trusted interface, no rate-limiting of ILBP traffic will be performed on that interface. It is noted that even in such embodiments, a user can still specify a rate limit for a trusted interface. In such situations, the user-specified rate-limit will be used to control ILBP messages received via the trusted interface.

As noted above, some interfaces 22A-22n can be logical interfaces. For example, a protocol such as EtherChannel can be used to aggregate several physical interfaces into a single logical interface. When a request to aggregate interfaces is detected, switch 20 can verify that the interfaces to be aggregated are either all configured as trusted interfaces or all configured as untrusted interfaces. Switch 20 will not allow an aggregated interface that includes a trusted interface if the aggregated interface would also include an untrusted interface, or vice versa. Alternatively, switch 20 can cause an interface that has a non-matching class (trusted or untrusted) to be placed into a suspended state if that interface is included in an aggregated interface. A user can specify the class (trusted or untrusted) of an aggregated interface; if so, ILBP configuration information 112 is updated to indicate that all physical interfaces within that aggregated interface also have the user-specified trust state.

Similarly, a user can specify a rate limit for an aggregated interface. It is noted that in some embodiments, rate limits can independently specified for an aggregated interface and for each of the physical interfaces within that aggregated interface. For example, a user can specify a rate limit of 45 ILBP messages per second for an aggregated interface that includes three physical interfaces, even though the rate limit for each physical interface can be set to 20 ILBP messages per second. When performing rate-limiting for an aggregated interface, a rate-limiting module 130 determines the cumulative rate at which ILBP messages are being received via the aggregated interface by summing the rates of each of the physical ports. In addition to dropping ILBP messages that contain invalid inter-layer bindings, ILBP security agent 110 can also perform other security actions. For example, ILBP security agent 110 can store information corresponding to each dropped ILBP message in a log. An administrator can access such a log in order to obtain information for use in analyzing a network attack. As another example, ILBP security agent 110 can cause rate-limited system messages to be displayed on a console and/or sent to an administrator (e.g., using simple network management protocol (SNMP)) each time a ILBP message (or number or rate of messages) is dropped.

Figure 2:
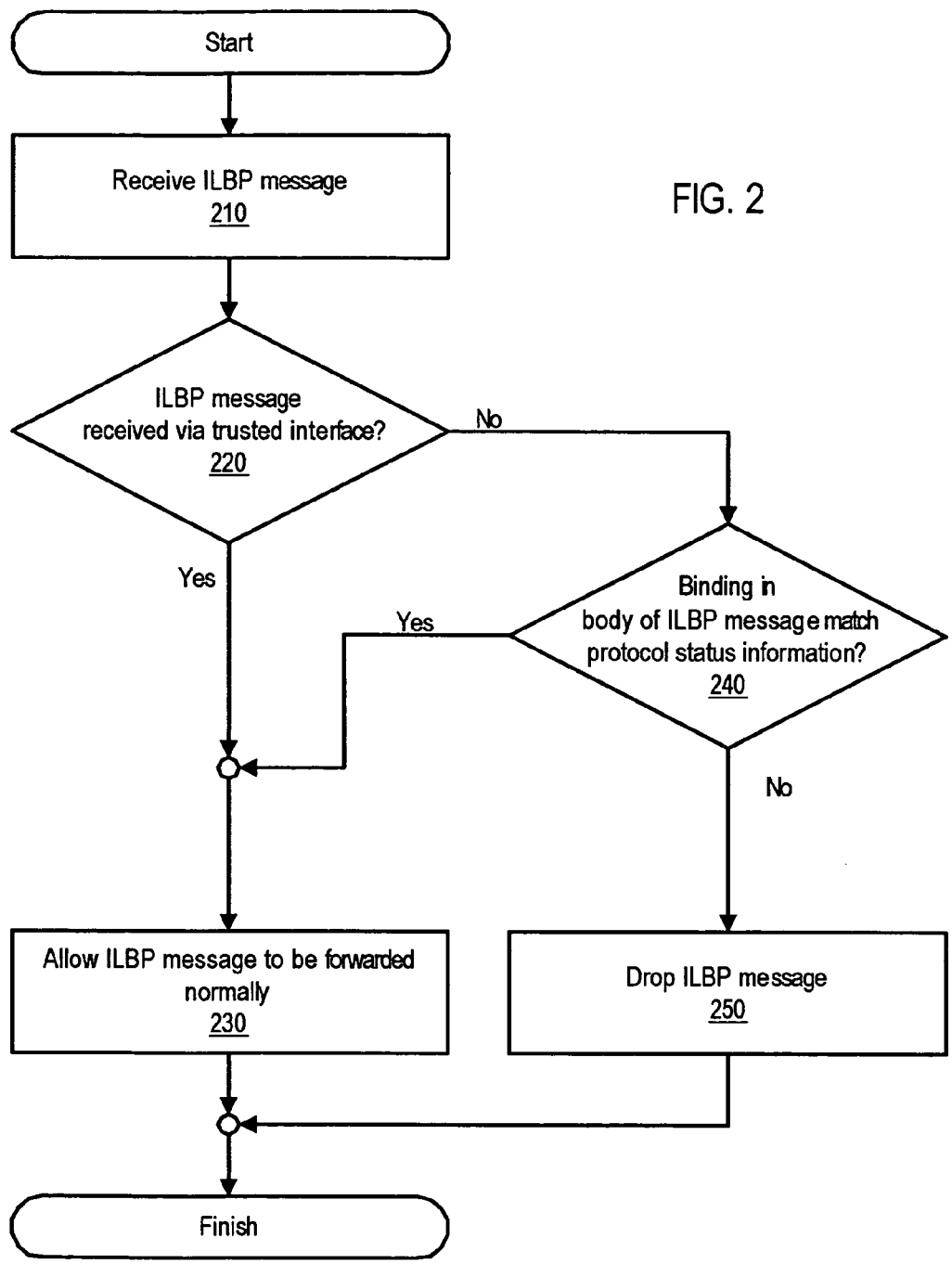
FIG. 2 is a flowchart of one embodiment of a method of providing security for ILBP traffic.

FIG. 2 is a flowchart of one embodiment of a method of validating ILBP traffic. As shown at 210, an ILBP message is received. At 220, it is determined whether the ILBP message was received via a trusted interface or a non-trusted interface. If the ILBP message was received via a trusted interface, the ILBP message is allowed to be forwarded normally, at 230, without first being validated.

If the ILBP message was not received via a trusted interface, as determined at 220, the ILBP message is validated, as shown at 240. In this example, validating the ILBP message involves comparing an inter-layer binding contained in the body of the ILBP message to protocol status information (e.g., as obtained by snooping protocol messages and/or as obtained via a user-supplied configuration). If a matching inter-layer binding is found in the protocol status information, the ILBP message is determined to be valid, and the ILBP message is forwarded normally, at 230. If no matching inter-layer binding is found in the protocol status information, the ILBP message is determined to be invalid. Accordingly, the invalid ILBP message is dropped, as shown at 250. It is noted that functions 220, 230, 240, and 250 can be performed by an ILBP security agent 110 as shown in FIG. 1.

It is noted that the functions illustrated in FIG. 2 can be performed in a different order than is shown in FIG. 2. Additionally, in some embodiments, certain functions may be eliminated. For example, some embodiments do not classify interfaces as trusted or untrusted. In such embodiments, function 220 will not be performed (i.e., ILBP messages received via any interface will be validated). Additionally, it is noted that other functions can also be performed instead of and/or in addition to those shown in FIG. 2. For example, before validating an ILBP message, an additional function can be performed to determine whether the message is being conveyed in a VLAN for which ILBP validation is enabled. If the ILBP message is being conveyed in a VLAN for which ILBP validation is not enabled, the ILBP message will be forwarded normally without first being validated at 240.

Figure 3:
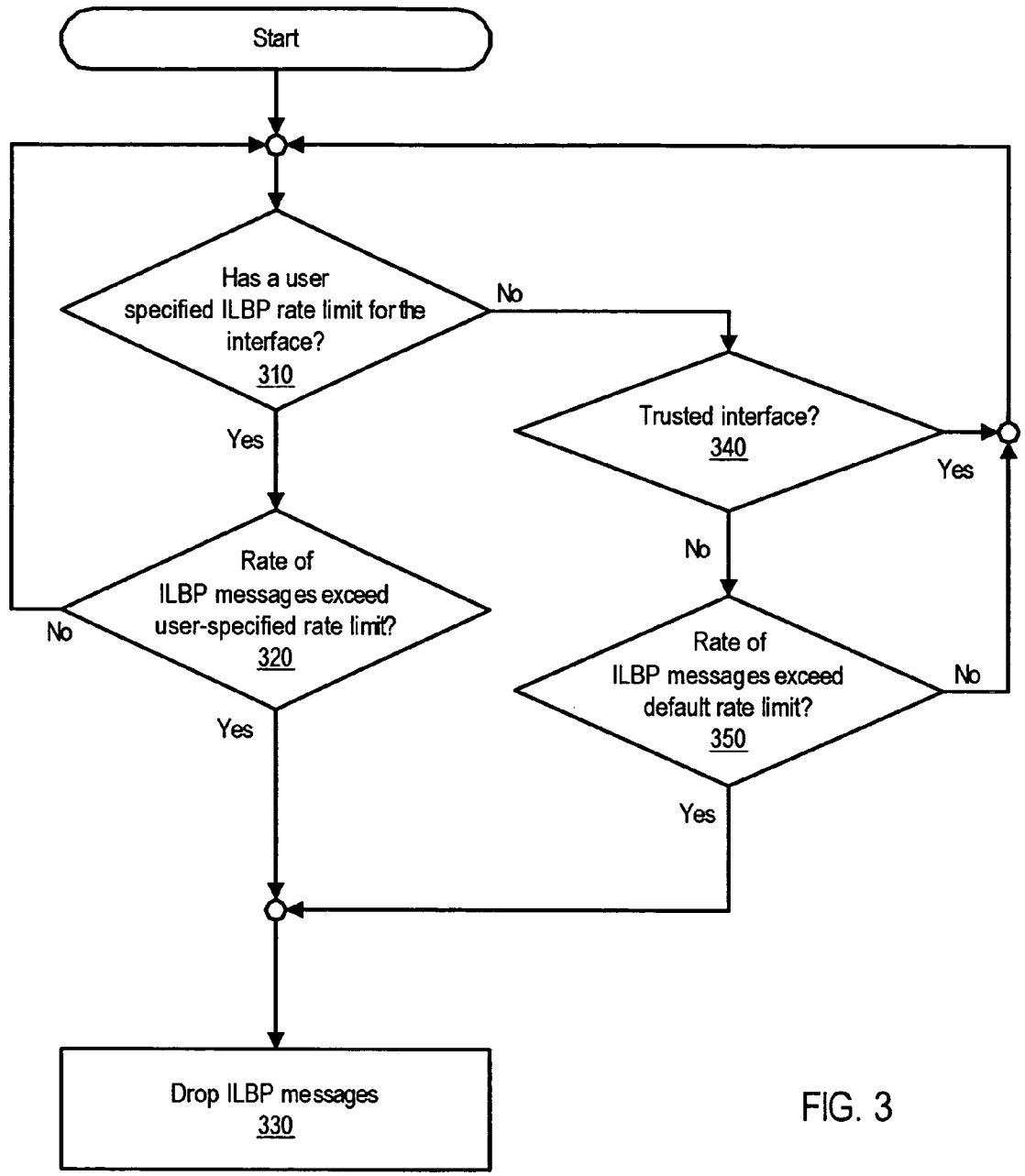
FIG. 3 is a flowchart of one embodiment of a method of providing security for ILBP traffic that involves rate-limiting ILBP messages.

FIG. 3 is a flowchart of one embodiment of a method of rate-limiting ILBP messages. In this example, a default rate limit is applied to an interface, unless a user has specified a rate limit for that interface. It is noted that in other embodiments, default rate limits are not used (e.g., rate-limiting is only performed for an interface if a user has specified a rate limit for that interface).

At 310, it is determined whether a user has specified an ILBP rate limit for a particular interface of a network device. If so, the user-specified ILBP rate limit is used to perform rate-limiting for the interface, as indicated at 320. If the current rate of ILBP messages being received via the interface exceeds the user-specified rate limit, one or more ILBP messages received via the interface will be dropped, as indicated at 330. As noted above, ILBP messages can be caused to be dropped in a variety of ways, including selectively dropping ILBP messages (and thus not dropping non-ILBP messages), dropping all messages (ILBP messages and non-ILBP messages) received by the interface that are conveyed via a particular VLAN, and dropping all messages received via the interface. Messages can be dropped by deleting the messages from a buffer (e.g., at the receiving interface) and/or by not allowing the messages to be stored in a buffer within the network device. It is noted that in some embodiments, once an interface begins dropping ILBP messages, the interface can continue to drop ILBP messages until an administrator resets the interface or otherwise intervenes. In other embodiments, the interface may cease dropping ILBP messages after a certain amount of time has elapsed and/or the rate of ILBP messages has again decreased below the user-specified rate limit. Dropping the messages when the rate limit is exceeded can reduce a drop in performance that might otherwise be experienced by a network device (e.g., if ILBP validation is performed in software, the network device might suffer a significant performance loss if the network device attempted to verify an exceedingly large number of ILBP messages in a short period of time).

If the current rate of ILBP messages being received via the interface does not exceed the user-specified rate limit, normal operation continues (i.e., ILBP messages received via the interface are not dropped due to an ILBP rate-limiting mechanism, although those messages may still be dropped by another mechanism within the network device). Processing returns to function 310.

If no user-specified rate limit has been received for the interface, a determination as to whether the interface is a trusted interface can be made, as shown at 340. This determination is used in embodiments that have different default rate limits for trusted and untrusted interfaces.

In the illustrated embodiment, there is no rate limit for trusted interfaces. Accordingly, if the interface is a trusted interface, as determined at 340, processing returns to function 310.

If the interface is not a trusted interface, a default rate limit is used. As shown at 350, if the current rate of ILBP messages being received via the interface exceeds the default rate limit, one or more ILBP messages received via the interface will be dropped, as shown at 330. If the default rate limit is not currently being exceeded, processing returns to function 310.

In some embodiments, functions 310, 320, 330, and 350 are performed by a rate-limiting module 130, such as those shown in FIG. 1. Thus, such functions can be performed by the interface that is receiving the messages. It is noted that function 340 can be performed by a control agent (e.g., an operating system) executing on a network device, which can update a rate limit for an interface (e.g., by updating a rate-limit storage module 132, as shown in FIG. 1, in response to user input classifying the interface as a trusted or untrusted interface.

As with FIG. 2, it is noted that the functions in FIG. 3 can be performed in a different order in other embodiments. Additionally, other embodiments can eliminate certain functions and/or perform other functions instead of and/or in addition to those functions shown in FIG. 3.

Figure 4:
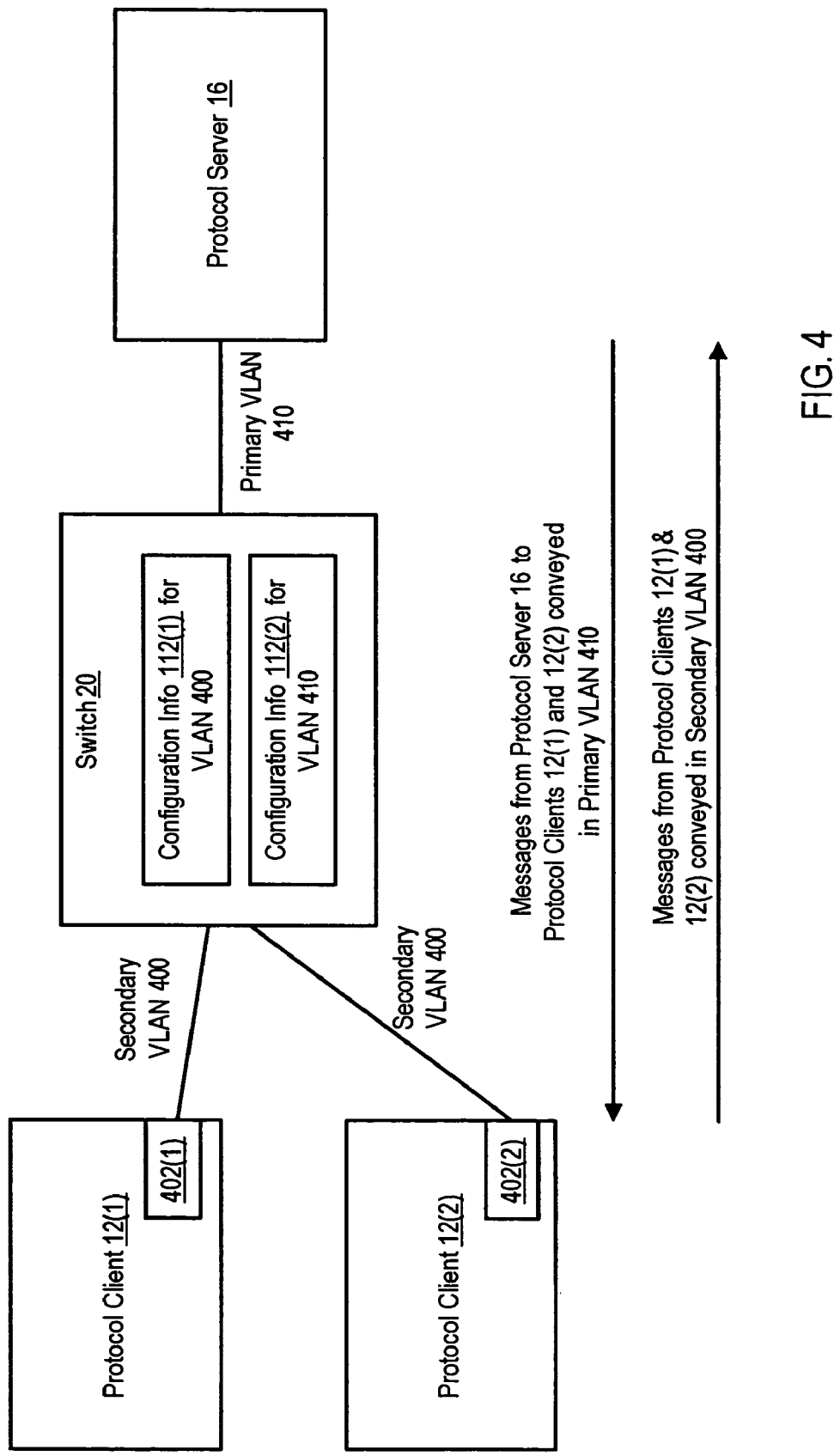
FIG. 4 illustrates a switch that supports private VLANs and is configured to provide security for ILBP traffic being conveyed via private VLANs, according to one embodiment of the present invention.

FIG. 4 illustrates how a private VLAN can be implemented in a network. As shown, two protocol clients (e.g., two DHCP clients) 12(1) and 12(2) are coupled to a protocol server 16 by (at least) one network device, switch 20. Switch 20 provides security actions for ILBP traffic as described above. In this example, each protocol client 12(1) and 12(2) is coupled to switch 20 by a different isolated port within secondary VLAN 400. In particular, protocol client 12(1) is coupled to switch 20 by isolated port 402(1) of secondary VLAN 400, while protocol client 12(2) is coupled to switch 20 by isolated port 402(2) of secondary VLAN 400. Secondary VLAN 400 is implemented as a private VLAN within a primary VLAN 410, which conveys traffic between protocol clients 12(1) and 12(2) and protocol server 16. Secondary VLAN 400 is private in that clients 12(1) and 12(2) cannot communicate directly with each other via secondary VLAN 400. Messages generated by protocol clients 12(1) and 12(2) are conveyed in secondary VLAN 400. Messages generated by protocol server 16 are conveyed in primary VLAN 410.

Private VLANs are often used to provide L2 isolation between different interfaces of a network device such as switch 20. Private VLANs are defined by configuring interfaces as promiscuous, isolated, and/or community interfaces and mapping each interface to a primary or secondary VLAN (isolated interfaces are illustrated in FIG. 4). Isolated interfaces belong to isolated secondary VLANs, while community interfaces belong to community secondary VLANs. A given interface can belong to an isolated VLAN, a community VLAN, multiple community VLANs, or one or more community VLANs and an isolated VLAN. Isolated and community interfaces are part of secondary VLANs, while promiscuous interfaces are part of primary VLANs. In this example, the interface coupled to protocol server 16 is a promiscuous interface. The interfaces 402(1) and 402(2) coupled to the protocol clients 12(1) and 12(2) are isolated interfaces. Messages received via a promiscuous interface in a primary VLAN can be conveyed via any other isolated, community, or promiscuous interfaces in the same primary VLAN. Thus, in FIG. 4, messages received by switch 20 from protocol server 16 can be conveyed to any of the isolated interfaces (depending on other criteria associated with such messages, which may be used to select a particular interface).

In contrast, messages that are received by switch 20 from an isolated or community interface can only be sent via promiscuous interfaces in the same primary VLAN and community interfaces in the same community secondary VLAN. Isolated interfaces that are part of the same secondary VLAN cannot exchange messages (i.e., a messages received via an isolated interface cannot be sent via another isolated interface, even if the other isolated interface is in the same secondary VLAN as the receiving interface). Community interfaces can only exchange messages with promiscuous interfaces in the same primary VLAN and other isolated and community interfaces in the same secondary VLAN.

As described below, protocol status information 60 (of FIG. 1) is typically generated in response to a protocol message (e.g., a DHCP ACK) being conveyed from a protocol server to a protocol client. As shown in FIG. 4, such messages are conveyed in the primary VLAN 410. When validating an inter-layer binding in an ILBP message conveyed in VLAN 400 against protocol status information 60, ILBP security agent 110 (also of FIG. 1) can compare both protocol status information associated with primary VLAN 410 and protocol status information associated with secondary VLAN 400 to the inter-layer binding.

Users (e.g., network or system administrators) can configure ILBP security actions for each VLAN. Accordingly, a user can configure ILBP security actions for both primary VLAN 410 and secondary VLAN 400 independently of each other (e.g., a user could enable ILBP security actions for secondary VLAN 400 without enabling ILBP security actions for primary VLAN 410. However, since secondary VLAN 400 is a private VLAN, switch 20 will use the configuration information for primary VLAN 410 to determine security actions for messages conveyed via secondary VLAN 400. In other words, even though a user may specify configuration information 112(1) for secondary VLAN 400 independently of configuration information 112(1) for primary VLAN 410, configuration information 112(1) will not be used to determine how security actions are performed for ILBP messages conveyed in the secondary VLAN. Instead, configuration information 112(2) will control whether security actions are performed for ILBP messages conveyed in secondary VLAN 400. Thus, if a user has enabled ILBP message validation on primary VLAN 410 but disabled ILBP message validation on secondary VLAN 400, ILBP messages being conveyed in secondary VLAN 400 will nevertheless be validated.

Figure 5:
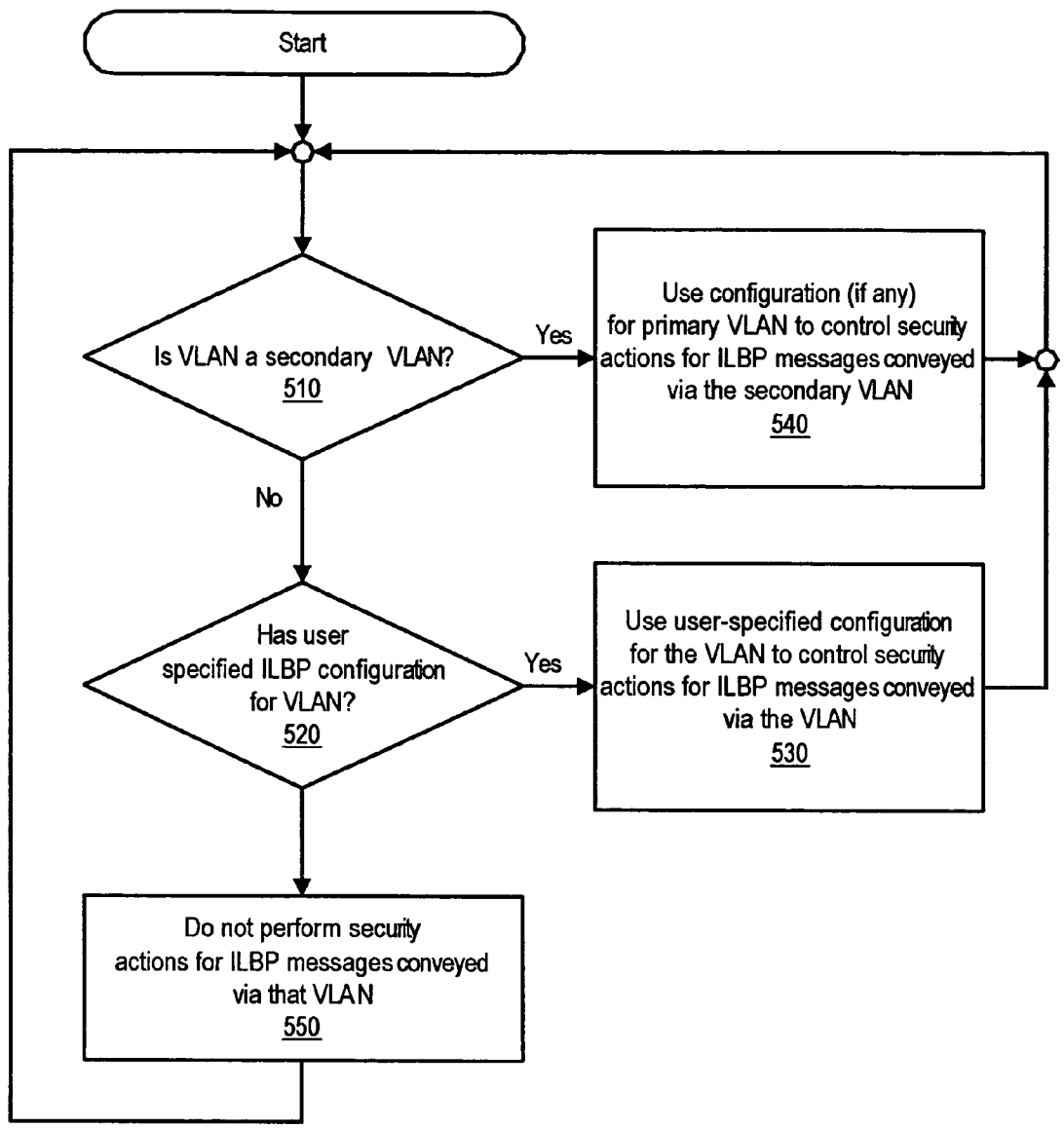
FIG. 5 is a flowchart of one embodiment of a method of using user-specified configuration information to determine how to provide security for ILBP traffic being conveyed via a particular VLAN.

FIG. 5 is a flowchart of a method of using user-specified configuration information to determine how to provide security for ILBP traffic being conveyed via a particular VLAN. This method can be performed, for example, by an ILBP security agent 110 (as shown in FIG. 1) in order to determine whether to perform a security action (e.g., such as validation) for an ILBP message received via a particular VLAN. In this example, the default configuration for a VLAN indicates that no security actions should be performed for ILBP traffic conveyed on that VLAN. This default state is shown at function 550 of FIG. 5. It is noted that alternative embodiments can implement a different default state.

At 510, a determination is made as to whether the VLAN is a secondary VLAN that implements a private VLAN. If so, the configuration for the primary VLAN, which is associated with the private VLAN, is used to control whether security actions are performed for ILBP messages conveyed in the secondary VLAN, as shown at 540. For example, if ILBP validation has been enabled on the primary VLAN, ILBP validation will be performed for the secondary VLAN.

If the VLAN is not a secondary VLAN, another determination as to whether a user has specified ILBP configuration information for that VLAN is made, as shown at 520. If so, the user-specified configuration is used to control whether security actions are performed for ILBP messages conveyed in the VLAN, as shown at 530. If no user-specified configuration has been provided, no security actions will be performed for ILBP messages conveyed in that VLAN, as shown at 550.

It is noted that in some embodiments, certain functions of FIG. 5 are not performed. For example, in one embodiment, no determination as to whether user-specified configuration (function 520) is available is made. Instead, any available configuration for the VLAN is used, without regard as to whether the configuration is a user-specified configuration. Additionally, in alternative embodiments, certain functions are performed instead of and/or in addition to the functions shown in FIG. 5.

Figure 6:
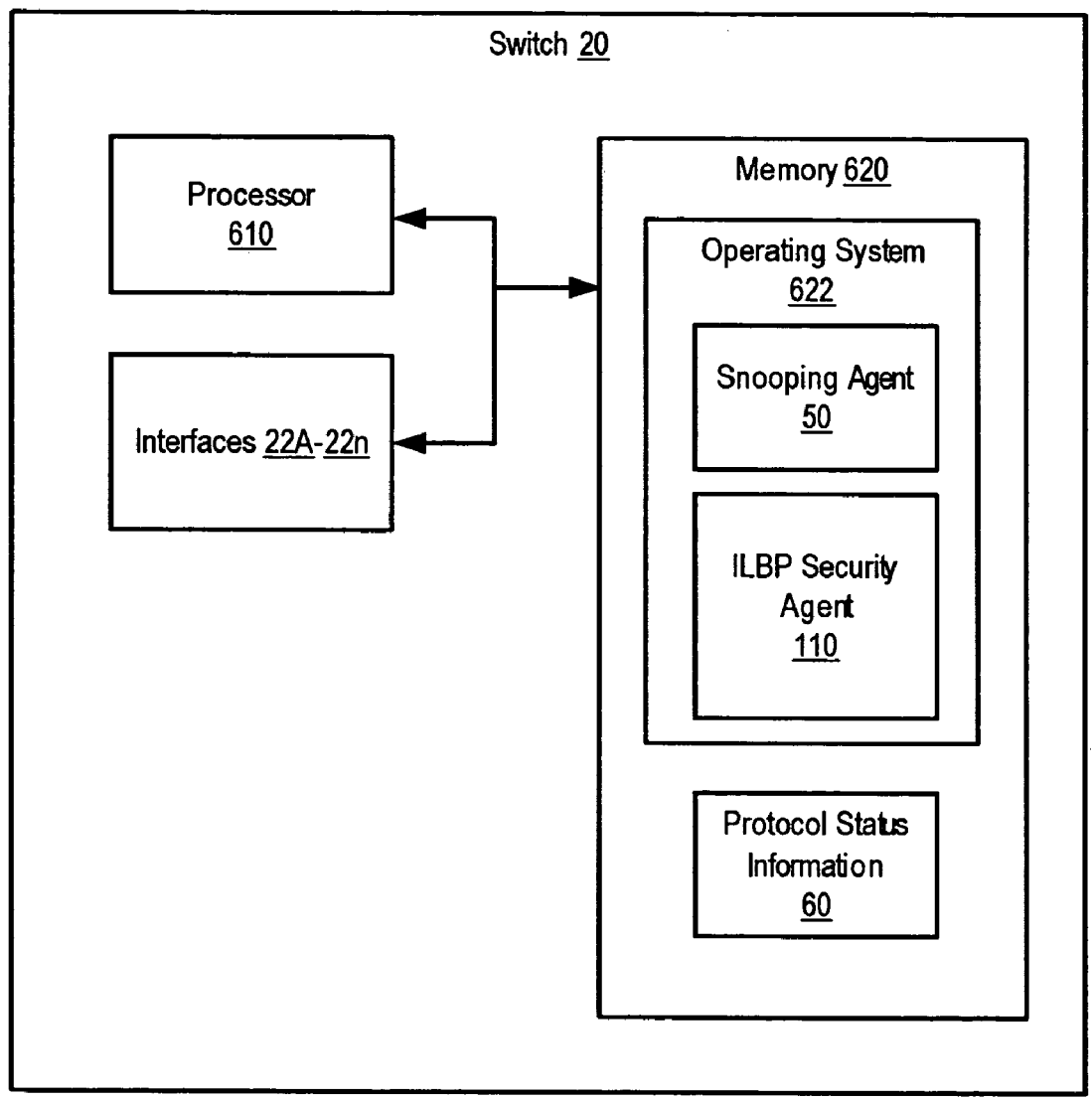
FIG. 6 is a block diagram of a switch illustrating how a snooping agent and ILBP security agent can be implemented in software executing on the switch, according to one embodiment.

FIG. 6 is a block diagram of switch 20 illustrating how a snooping agent 50 and ILBP security agent 110 (which filters ILBP messages based on protocol status information 60 obtained by snooping agent 50, using the techniques described above) and can be implemented in software executing on a network device such as switch 20. It is noted that other components (e.g., forwarding engine 120, as shown in FIG. 1) can also be implemented in software executing on switch 20 in some embodiments. As illustrated, switch 20 includes one or more processors 610 (e.g., implemented using one or more microprocessors, PLDs (Programmable Logic Devices), ASICs (Application Specific Integrated Circuits), or the like) configured to execute program instructions stored in memory 620. Memory 620 can include various types of RAM, ROM, Flash memory, MEMS memory, and the like. Processor 610, interfaces 22A-22n, and memory 620 are coupled to send and receive data and control signals by a bus or other interconnect.

Memory 620 stores program instructions executable by processor 610 to implement an operating system 622 configured to control basic functionality of switch 20. Operating system 622 can include snooping agent 50 and ILBP security agent 110 (alternatively, snooping agent 50 and ILBP security agent 110 can be implemented as programs that interact with, but is not part of, operating system 622). Operating system 622 provides a user interface via which a user can update configuration information (e.g., such as configuration information indicating whether ILBP security actions are enabled for a particular VLAN and rate-limiting information specifying a rate limit for ILBP messages received via a particular interface). Memory 620 may also be used to store protocol status information 60 used and maintained by snooping agent 50.

The program instructions and data implementing snooping agent 50 and ILBP security agent 110 can be stored upon various computer readable media such as memory 620. In some embodiments, software implementing snooping agent 50 and ILBP security agent 110 is stored on a computer readable medium such as a CD (Compact Disc), DVD (Digital Versatile Disc), hard disk, optical disk, tape device, floppy disk, and the like). In order be executed by processor 610, the instructions and data implementing snooping agent 50 and ILBP security agent 110 are loaded into memory 620 from the other computer readable medium. The instructions and/or data implementing snooping agent 50 and/or ILBP security agent 110 can also be transferred to switch 20 via a network such as the Internet or upon a carrier medium. In some embodiments, a computer readable medium is a carrier medium such as a network and/or a wireless link upon which signals such as electrical, electromagnetic, or digital signals, on which the data and instructions implementing snooping agent 50 and ILBP security agent 110 are encoded, are conveyed.

It is noted that, as used herein, "protocol messages" are messages that are conveyed according to a protocol (e.g., DHCP) that is used to assign network addresses to protocol clients. "Non-protocol messages" are messages that are conveyed via a protocol (e.g., IP, IPX (Internetwork Packet Exchange), and the like) other than the protocol that is used to assign network addresses to protocol clients.

Protocol Snooping

Figure 7:
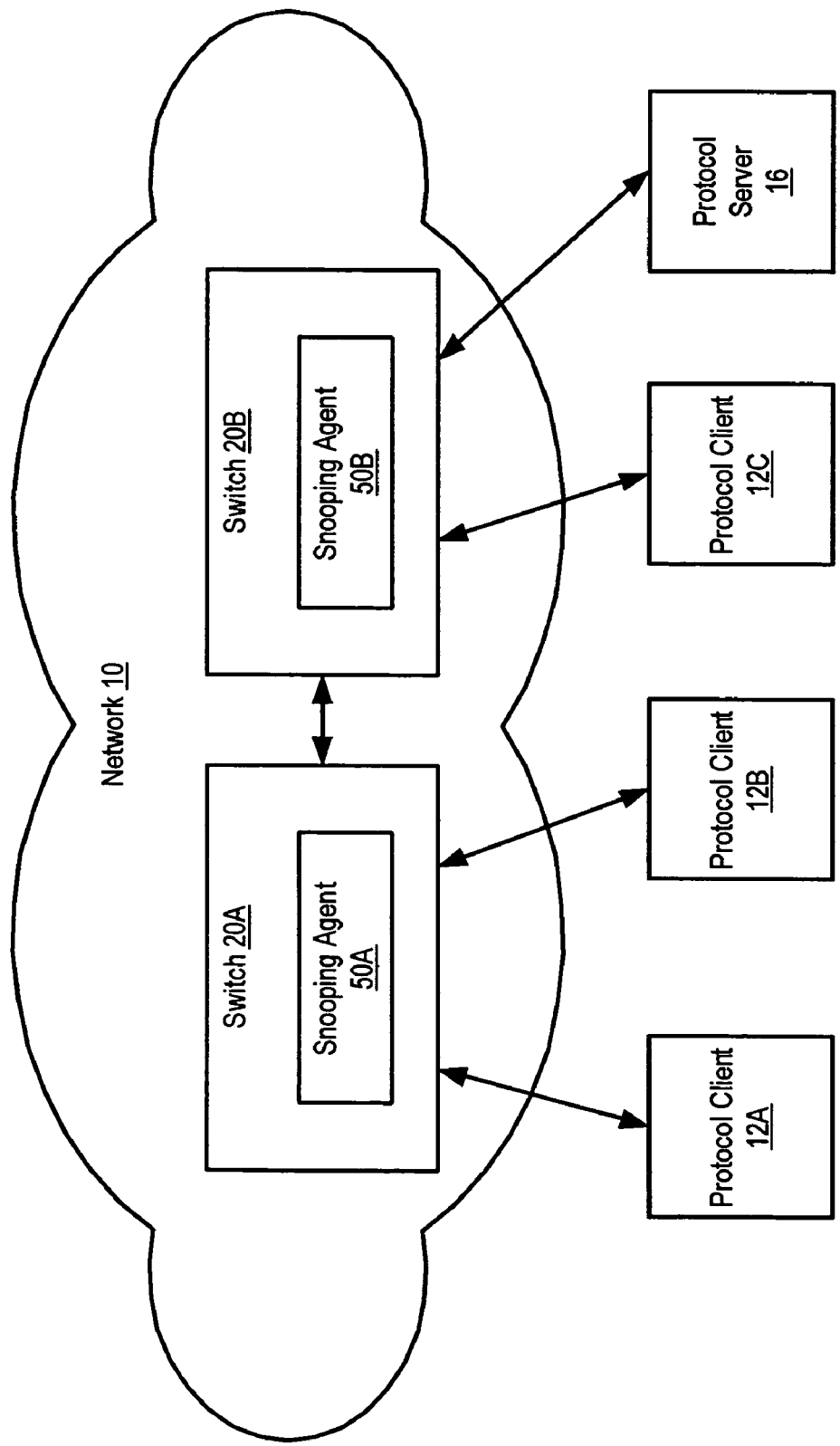
FIG. 7 is a block diagram of network coupling protocol clients to a protocol server, according to one embodiment.

FIG. 7 is a block diagram of network 10 coupling protocol clients 12A-12C (collectively, protocol clients 12) to protocol server 16, according to one embodiment. Network 10 includes several network devices, including switches 20A-20B (collectively, switches 20). Note that other embodiments may include significantly more network devices (and network devices of different types, such as routers) in network 10.

Each switch 20 in network 10 may be configured to handle messages from other network devices and from various computing devices coupled by the network 10. At least some of these messages may be protocol messages being sent between protocol clients 12 and protocol server 16.

In a communications network such as network 10, switching devices such as switches 20 operate by receiving data at one of a set of input interfaces and forwarding the data on to one or more of a set of output interfaces. Users typically require that such switching devices operate as quickly as possible in order to maintain a high throughput. Switches are typically data-link layer devices that enable multiple physical network (e.g., local area network (LAN) or wide area network (WAN)) segments to be interconnected into a single larger network. Switches 20 are, in some embodiments, implemented as OSI (Open Systems Interconnection) layer 2 devices. Switches 20 can include logic and/or software that provides for the forwarding of messages based on the messages' destination information.

The data received and forwarded by switches 20 is logically grouped into one or more messages. Throughout this disclosure, the term "message" is used to refer to a logical grouping of information sent as a data unit over a transmission medium. Messages may include header and/or trailer information that surrounds user data contained in the data unit. For purposes of this disclosure, a "message" may include a cell, datagram, frame, packet, segment, or any other logical group of information.

Switches 20 include various interfaces to protocol clients 12 and protocol server 16. These interfaces may include physical interfaces (e.g., on a line card internal to a switch) and/or logical interfaces (also referred to as virtual interfaces). For example, a physical interface that receives messages for several VLANs (Virtual Local Area Networks) can include several logical interfaces, one for each VLAN. Alternatively, a logical interface can be an interface that is located on a physically separate intermediate network device, coupled between the switch and a group of protocol clients, that passes messages sent by the protocol clients to the switch without making forwarding decisions (this type of interface is also described as a remote interface). Furthermore, the interfaces may be organized in various ways. For example, in some embodiments, interfaces are organized hierarchically. In one such embodiment, physical interfaces within a switch reside at the top level of the hierarchy. A physical interface to devices in several different VLANs can include several VLAN-specific logical interfaces that are organized beneath the physical interface in the switch's interface hierarchy.

In some embodiments, protocol clients 12 and protocol server 16 each include one or more of various types of computing devices. For example, protocol clients 12 and/or protocol server 16 can each be a personal computer, a workstation, an Internet server, a network appliance, a handheld computing device such as a cell phone or PDA (Personal Data Assistant), or any other type of computing device. Protocol clients 12 and protocol server 16 can also be implemented in software processes executing on such computing devices.

Protocol clients 12 and protocol server 16 can each be directly or indirectly connected to one of switches 20. For example, in some embodiments, protocol clients 12A and 12B are coupled directly to switch 20A (e.g., switch 20A is included in a wiring closet on the same site as protocol clients 12A and 12B). In other embodiments, protocol clients 12A and 12B are indirectly coupled to switch 20A through one or more intermediate network devices that send messages received from protocol clients 12A and 12B to switch 20A.

Similarly, switches 20A and 20B can be directly or indirectly coupled to each other. For example, one or more routers (as well as one or more other switches or other network devices) can be interposed between switch 20A and switch 20B.

Protocol server 16 provides network services to protocol clients according to a network protocol. For example, in one embodiment, protocol server 16 is configured to implement a DNS (Domain Name System) server. A protocol client 12 can request an IP (Internet Protocol) address that corresponds to a particular domain name from DNS protocol server 16. DNS protocol server 16 responds by sending the protocol client 12 a message that includes the requested IP address according to the DNS protocol. Protocol client 12 can then use the IP address assigned by the DNS protocol server 16 to communicate with other clients via network 10.

In another embodiment, protocol server 16 is configured to implement a DHCP (Dynamic Host Configuration Protocol) server. A protocol client 12 may send a message requesting an IP address from protocol server 16. In response to the request, protocol server 16 sends a message assigning an IP address to the protocol client 12.

In other embodiments, many additional network service protocols can be implemented in addition to and/or instead of DNS and DHCP. For example, in another embodiment, protocol server 16 is a Reverse ARP (Address Resolution Protocol) server.

Each switch 20 (and/or router or other network device in network 10) includes a snooping agent 50. As shown in FIG. 7, switch 20A includes snooping agent 50A and switch 20B includes snooping agent 50B.

Each snooping agent 50 is configured to intercept protocol messages being sent between protocol clients 12 and protocol server 16 via network 10. In response to the intercepted protocol messages, snooping agent 50 updates protocol status information locally to a network device (e.g., switch 20 or a router) in which snooping agent 50 is implemented. Thus, each snooping agent 50 is an example of a means for updating protocol status information in response to intercepting a protocol message being conveyed between a protocol client and a protocol server. This protocol status information includes network traffic information indicative of how messages (both protocol messages and non-protocol messages) are conveyed to network 10 by each of protocol clients 12. For example, snooping agent 50A can store information indicating which of the physical and/or logical interfaces included in switch 20A received a protocol message from client 12B requesting a network service. The protocol status information may also include information included in the protocol messages themselves. For example, snooping agent 50A can store information, such as an IP address, included in protocol server 16's reply to the protocol request from client 12B. Thus, the protocol status information can also include protocol information generated by protocol server 16. Each snooping agent 50 can then use its protocol status information to determine whether to perform various security actions such as dropping messages.

Figure 8A:
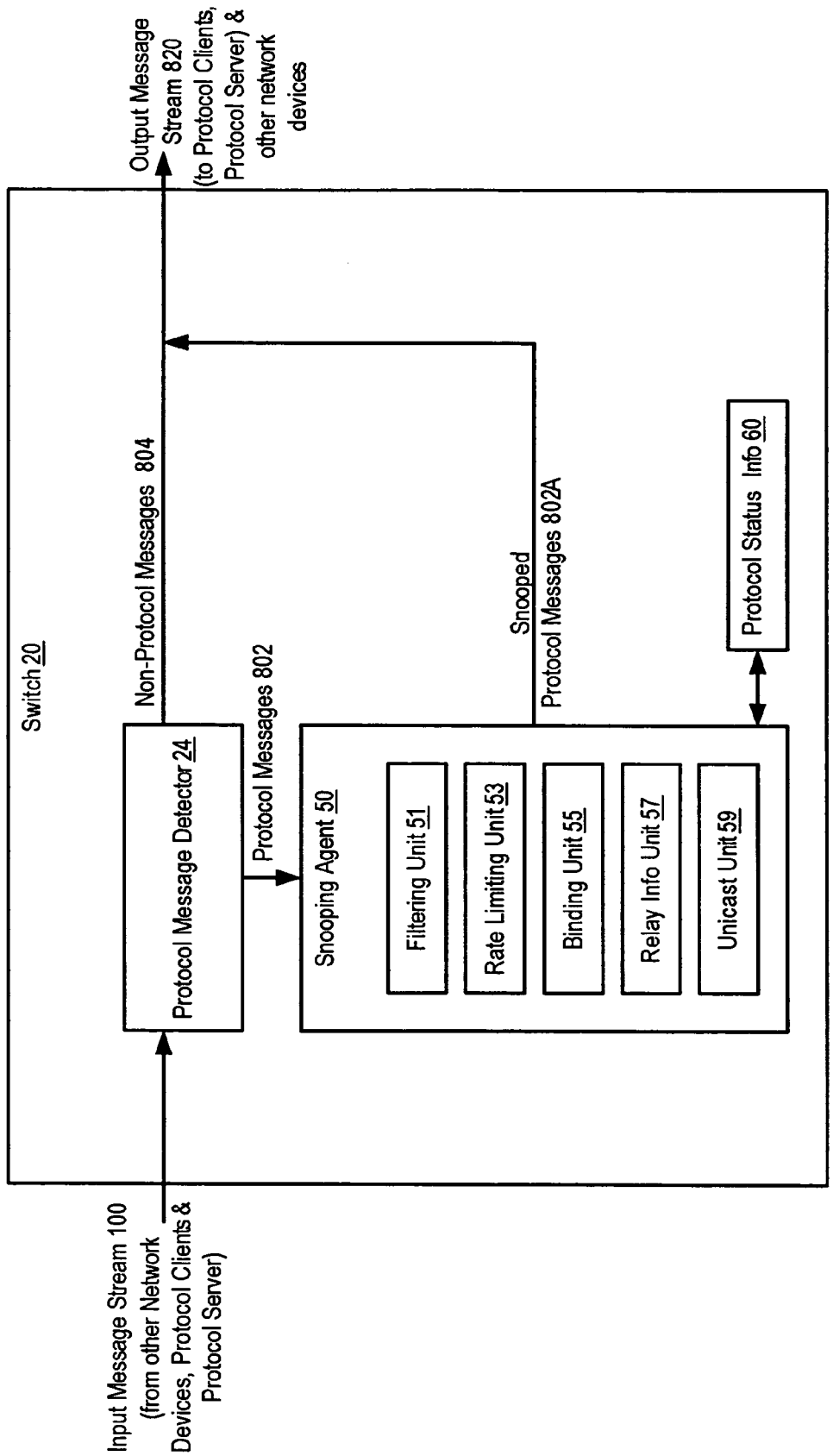
FIG. 8A shows a block diagram of a switch configured to snoop protocol messages being conveyed via a network and to update protocol status information in response to the snooped protocol messages, according to one embodiment.

FIG. 8A shows a block diagram of a switch 20 that snoops protocol messages being conveyed via a network and updates protocol status information in response to the snooped protocol messages. As shown in FIG. 8A, switch 20 includes a protocol message detector 24, a snooping agent 50, and a storage unit that stores protocol status information 60. Protocol status information 60 can be stored in various types of memory, including ROM (Read Only Memory), RAM (Random Access Memory), MEMS (Micro Electro-Mechanical Systems) memory, Flash memory, and the like.

As shown in FIG. 8A, switch 20 may receive an input message stream 100 via various logical and/or physical interfaces. The input message stream 100 may include various protocol messages 802 being conveyed between protocol server 16 and protocol clients 12 of FIG. 7. Additional messages 804 (e.g., data messages or messages implementing other protocols that are not intercepted by snooping agent 50) being conveyed via network 10 of FIG. 7 may also be included in the input message stream 100. Once the protocol messages 802 identified by protocol message detector 24 are processed by snooping agent 50, snooped protocol messages 802A (which may include modified versions of the protocol messages 802 input to snooping agent 50 and/or fewer messages than input protocol messages 802) are output with non-protocol messages 804 as part of output message stream 820 to other network devices, protocol clients, and/or protocol servers).

Figure 8B:
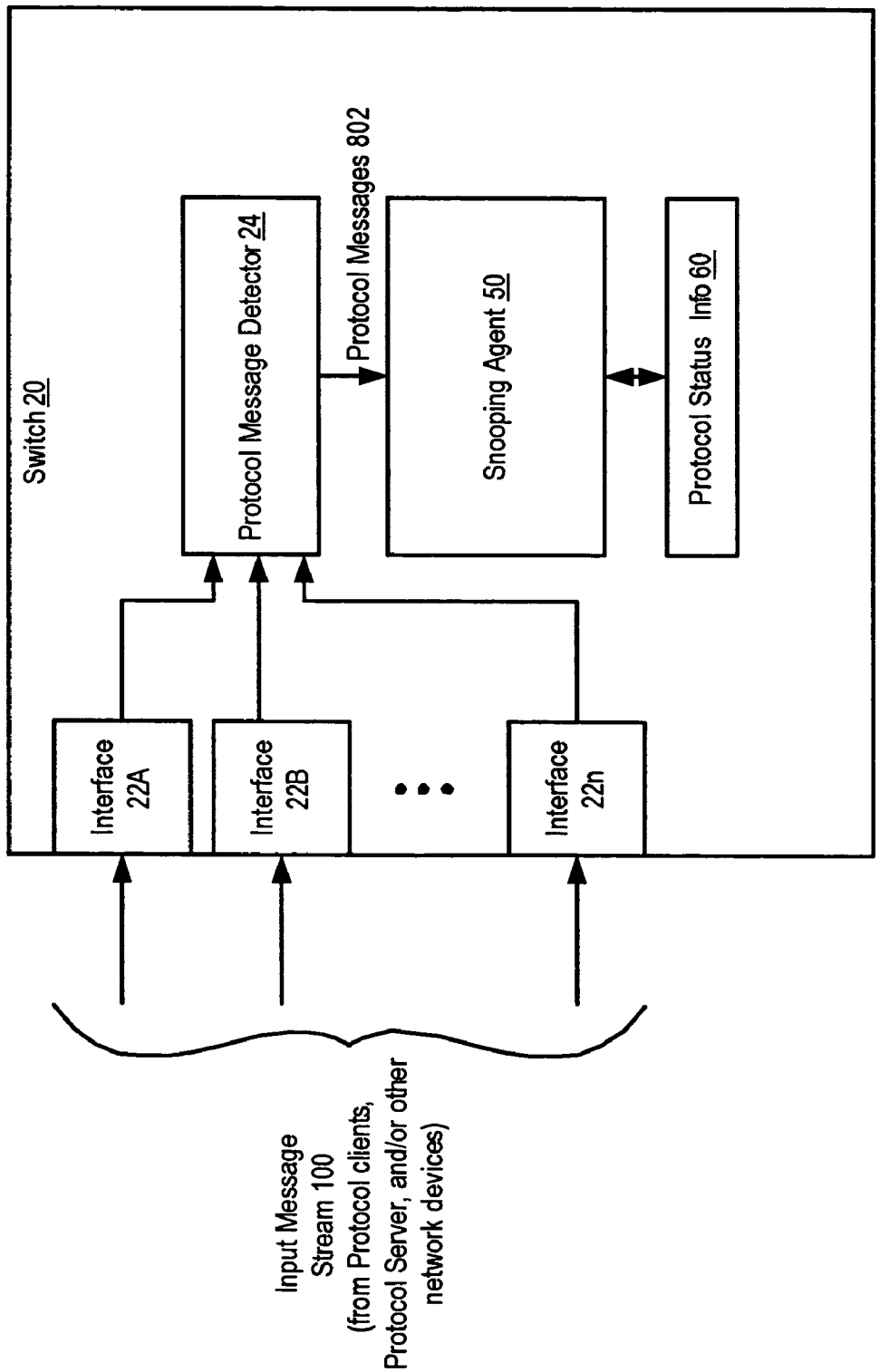
FIG. 8B shows another block diagram of a switch configured to snoop protocol messages being conveyed via a network and to update protocol status information in response to the snooped protocol messages, according to one embodiment.

FIG. 8B illustrates how switch 20 may include several interfaces 22A-22n (collectively, interfaces 22) that each interface to one or more other network devices, protocol clients, and/or protocol servers. Interfaces 22 can each be a logical or a physical interface. For example, interfaces 22A-22B can be included in the same physical interface, but interface 22A may handle messages being conveyed in one VLAN while interface 22B handles messages being conveyed in another VLAN. As noted above, in some embodiments, interfaces 22 can be organized hierarchically.

Returning to FIG. 8A, protocol message detector 24 is configured to identify protocol messages 802 that are received in input message stream 100. In one embodiment, protocol message detector 24 can be implemented using a CAM (Content Addressable Memory) and/or ACL (Access Control List). For example, information from each message can be input into a CAM, which responds by outputting a corresponding index, which is then used to lookup information in an ACL. If the message is a protocol message, the indexed information in the ACL may indicate that the protocol message should be handled by snooping agent 50. Alternatively, protocol message detector 24 can be implemented as a software process that analyzes each message in order to identify which messages are protocol messages. In other embodiments, other types of software and/or hardware can be used to implement protocol message detector 24.

In some embodiments, information in each message that identifies a source and/or destination software port is used by protocol message detector 24 to identify protocol messages. For example, if protocol messages requesting network services provided by the DNS protocol are addressed to server port 53, protocol message detector 24 can readily identify protocol messages to server port 53 as DNS protocol messages.

Whenever protocol message detector 24 identifies a protocol message (e.g., if the protocol being snooped is DHCP, protocol message detector 24 can identify DHCP messages in the message stream based on the software port to or from which the messages are addressed, as described above), the protocol message detector 24 causes the identified protocol message to be forwarded to snooping agent 50. For example, in one embodiment, protocol message detector 24 generates an interrupt, causing a software process implementing all or part of snooping agent 50 to be initiated to handle the identified protocol message. Snooping agent 50 can include a queue (not shown) to temporarily buffer protocol messages identified by protocol message detector 24.

In some embodiments, protocol message snooping is limited to a particular VLAN (Virtual Local Area Network) or performed differently depending on the VLAN in which the protocol message is being conveyed. In these situations, protocol message detector 24 also takes VLAN into account when identifying protocol messages within the input message stream. For example, if protocol message snooping is enabled for one VLAN but not for another, protocol message detector 24 only identifies protocol messages being conveyed in the VLAN for which snooping is enabled.

In response to receiving protocol messages detected by protocol message detector 24, snooping agent 50 performs various functions on and/or in response to the protocol messages. In the embodiment of FIG. 8A, snooping agent 50 includes filtering unit 51, rate limiting unit 53, binding unit 55, relay information unit 57, and unicast unit 59. In other embodiments, snooping agent 50 may include fewer or additional functional units. Snooping agent 50 can be implemented in hardware, software, or a combination of the two.

Filtering unit 51 filters protocol messages that are not consistent with protocol status information 60 from the message stream (e.g., by dropping those messages). In one embodiment, filtering unit 51 can verify a protocol message by comparing information included in a particular protocol message with information stored in protocol status information 60. If the information does not match, filtering unit 51 drops the message. For example, filtering unit 51 can handle a protocol message that includes information indicating that the protocol message is a reply from a protocol server to a protocol client. Filtering unit 51 accesses information included in protocol status information 60 to determine whether the protocol client currently has an outstanding protocol request. If there is no corresponding outstanding request, filtering unit 51 drops the reply. In some embodiments, performing this type of filtering makes it more difficult for a protocol server to be imitated by another device coupled to the network.

Similarly, filtering unit 51 can determine whether a protocol message (or non-protocol message) that includes information indicating that the message was sent by a particular client or server was actually sent by that client or server. This determination is based on information in protocol status information 60 indicating what network services (e.g., IP addresses) have been provided to particular clients and how protocol clients convey messages to the network. For example, protocol status information 60 can include network traffic information associating each client and each server with a particular interface 22 of switch 20. This information is typically obtained by snooping agent 50 the first time a protocol message from each client and each server is received into the switch 20 (in some embodiments, such information may also be obtained in response to non-protocol messages). This information is then maintained in protocol status information 60.

If a subsequent protocol or non-protocol message purporting to be from a particular client or server is received via a different interface than the interface identified in protocol status information 60 as being associated with that client or server, filtering unit 51 drops the message. This type of filtering interferes with the ability of a device coupled to the network to imitate a legitimate protocol client or server. Types of filtering such as this can be used to verify non-protocol messages being sent by a protocol client to a device other than a protocol server.

Rate limiting unit 53 drops protocol messages if a rate limit for protocol messages is exceeded. Information indicating the rate limit is included in protocol status information 60 in some embodiments. Depending on the embodiment, rate limiting may be performed on a per interface and/or per type (e.g., client-generated or server-generated) of protocol message basis. For example, client-generated protocol messages can be rate limited, while server-generated protocol messages are not rate limited. Alternatively, an independent rate limit can be associated with each interface (or group of interfaces). The rate limiting unit 53 applies the associated rate limit to protocol messages being communicated via a particular interface. If the rate limit at a particular interface (or group of interfaces) is exceeded, rate limiting unit 53 can disable that interface (or group of interfaces).

In one embodiment, rate limiting unit 53 implements a rate limiting algorithm based on the time at which a protocol message is received and the current value of a counter indicative of how many protocol messages have already been received during a given time interval. The counter can be associated with a particular interface (e.g., each interface 22 of FIG. 8B can have an associated counter, in one embodiment) or with a group of interfaces. The counter is reset periodically or reset based on certain conditions. Each time a new protocol message is received via an associated interface, rate limiting unit 53 increments the counter. For each protocol message received via the associated interface, rate limiting unit 53 compares the value in the counter to the rate limit for the associated interface. If the comparison indicates that the rate limit is exceeded, rate limiting unit 53 drops the protocol message, disables the associated interface, and/or logs an error message.

Binding unit 55 stores information obtained from intercepted protocol messages as part of protocol status information 60. For example, in an embodiment in which snooping agent 50 snoops DHCP messages, binding unit 55 can store an IP address assigned to a DHCP client by a DHCP server as part of protocol status information 60. Binding unit 55 can also store additional information identifying the DHCP client with that IP address. For example, binding unit 55 can store the DHCP client's MAC (Media Access Control) address and information identifying the VLAN in which that DHCP client is included. Binding unit 55 can also store information indicating how messages are communicated to that DHCP client. For example, binding unit 55 can store information identifying which interface 22 is coupled to receive messages from that DHCP client. Binding unit 55 also modifies (e.g., by changing, supplementing, and/or deleting) existing protocol status information 60 in response to subsequent protocol messages.

The integrity of protocol status information 60 affects how well filtering unit 51 identifies protocol messages to filter from the message stream. Accordingly, binding unit 55 can be configured to only modify protocol status information 60 in response to a snooped protocol message if that message has already been verified as being consistent with protocol status information 60 by filtering unit 51. This way, binding unit 55 will not modify protocol status information 60 in response to a protocol message that is filtered by filtering unit 51.

In some embodiments, binding unit 55 updates protocol status information 60 in response to protocol messages that are received via an interface to protocol clients and/or servers but does not update protocol status information 60 in response to protocol messages received via an interface to another network device that includes its own snooping agent 50. Stated another way, if switch 20 is the first switch (or other network device that includes snooping agent 50) in network 10 to handle messages sent by a particular protocol client, binding unit 55 updates protocol status information 60 in response to messages sent to and/or from that protocol client. If switch 20 is not the first switch in network 10 to handle messages sent by that protocol client, binding unit 55 will not update protocol status information 60 in response to messages to and from that protocol client. In this way, each switch in network 10 may be responsible for maintaining protocol status information 60 for a subset of the total group of protocol clients and/or servers coupled by the network. For example, looking at FIG. 7, switch 20A is responsible for updating its protocol status information in response to protocol messages to and from protocol clients 12A and 12B, while switch 20B is responsible for updating its protocol status information in response to protocol messages to and from protocol client 12C and protocol server 16.

Information indicating which interfaces 22 are coupled to protocol clients and/or servers and which interfaces 22 are coupled to other network devices may be programmed into switch 20 in some embodiments. For example, configuration information indicating which interfaces 22 are coupled to other network devices that include snooping agents 50 and which interfaces 22 are coupled to protocol clients may be loaded into a memory device included in switch 20 by a network administrator. Alternatively, each switch can learn which of its interfaces are coupled to protocol clients and/or servers, as opposed to being coupled to other network devices, by snooping protocol and/or non-protocol messages and updating protocol status information 60 to include information indicative of network traffic in response to the snooped messages, as described above.

Binding unit 55 may store information, generated by a protocol server, indicating how assigned network services may be used by a protocol client to which those services are assigned (such information may be stored in binding table 70, as described below with respect to FIG. 8C). For example, in certain protocols such as DHCP, assigned network services can be associated with lease times indicative of how long a client is allowed to continue using its assigned network services. In embodiments in which protocol messages for such a protocol are being snooped, binding unit 55 establishes a lease timer (e.g., as a value or set of values in protocol status information 60 that is incremented or decremented periodically). Similar information indicative of how a protocol server has indicated that a network service may be used by a client to which that network service is assigned may also be stored in protocol status information 60. Filtering unit 51 can use this information to determine whether a client is using its assigned network services consistently with the protocol server's limitations on those network services. If a protocol client that sends a protocol message is not using an assigned network service consistently with the information stored by binding unit 55, filtering unit 51 may drop the protocol message.

Relay information unit 57 verifies and/or modifies relay information included in protocol messages. Relay information is information that is be added to protocol messages by network devices (e.g., routers and switches) and used by various network devices to verify certain protocol message behavior. Relay information can be removed from protocol messages before those protocol messages are conveyed to protocol clients. One example of such relay information is provided in RFC 3046, which describes relay information that can be added to DHCP messages. Relay information unit 57 (and/or filtering unit 51) verifies protocol messages based on relay information included within those protocol messages. Relay information unit 57 can also remove relay information from a protocol message before that protocol message is sent to a protocol client. In one embodiment, relay information unit 57 adds relay information to the protocol message if switch 20 is the first network device with a snooping agent in network 10 to handle the protocol message. If switch 20 is not the first network device with a snooping agent in network 10 to handle the protocol message, relay information unit 57 verifies any preexisting relay information.

Unicast unit 59 detects protocol messages being sent from a protocol server to a protocol client and causes the detected messages to be unicast to the destination protocol client instead of being broadcast or multicast to multiple recipients. By unicasting the protocol messages, the ability of a device other than the destination client to snoop the information being provided to the client by the protocol server is inhibited. For example, if a DHCP ACK message is being sent, unicasting the message to the destination client makes it more difficult for another device (which might have received the DHCP ACK if the DHCP ACK had been multicast) to obtain the IP address being assigned to that client. This in turn makes it more difficult for the non-destination client to imitate the destination client device on the network.

In one embodiment, snooping agent 50 performs its various functions in the following order: rate limiting, filtering, binding, add/modify relay information, and unicasting. However, this order is merely an example. Other embodiments may order these functions differently.

In some embodiments, switch 20 snoops protocol messages being sent to implement several different protocols. For example, switch 20 can snoop DHCP, DNS, and Reverse ARP messages, generate protocol status information in response to the snooped messages, and perform security actions based on the protocol status information. In some such embodiments, switch 20 includes multiple protocol message detectors 24 (e.g., one protocol message detector 24 for each protocol being snooped), a single protocol message detector 24 configured to identify protocol messages for multiple different protocols, or a combination of such protocol detectors. Similarly, switch 20 can include multiple protocol-specific snooping agents 50 or, alternatively, one snooping agent 50 can maintain protocol status information for multiple different protocols. In some embodiments, protocol status information for each protocol is maintained independently. In other embodiments, protocol status information for the different protocols is collectively maintained and used to perform security actions. For example, information obtained by snooping DHCP messages can be used to filter DNS messages.

It is noted that snooping agent 50 and/or protocol message detector 24 can be implemented differently in different types of network devices. For example, protocol message detector 24 can be implemented in hardware within a switch 20 while being implemented in software within a router.

Figure 8C:
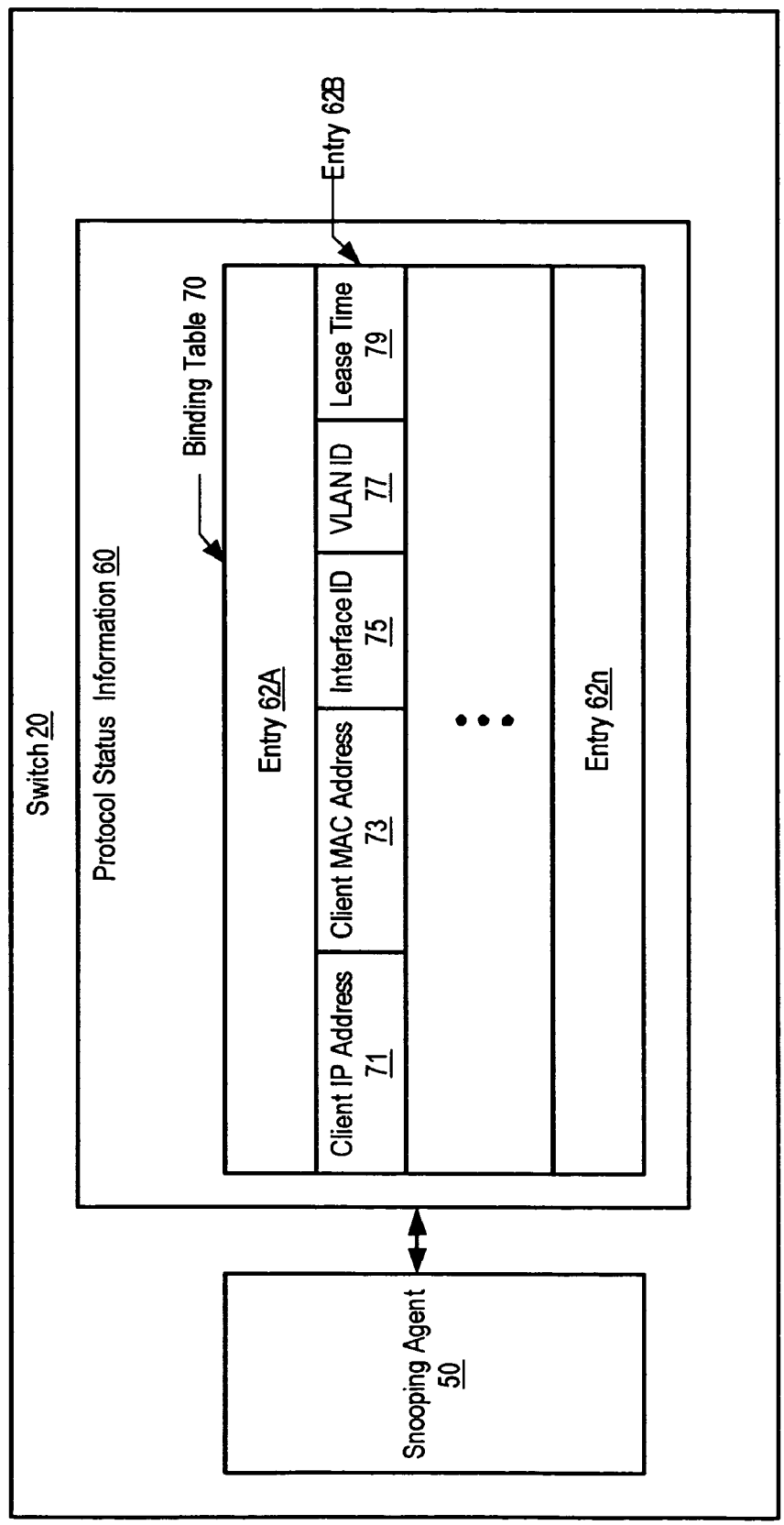
FIG. 8C is yet another block diagram illustrating an example of protocol status information maintained by a network device, according to one embodiment.

FIG. 8C is a block diagram illustrating an example of protocol status information that can be maintained by a network device such as switch 20. In this embodiment, snooping agent 50 intercepts DHCP messages and updates binding table 70 in protocol status information 60 in response to the snooped DHCP messages. Binding table 70 is similar to a binding table typically maintained by a DHCP server. Binding table 70 includes one or more entries 62A-62n (collectively, entries 62) that each correspond to a particular protocol client. As represented by entry 62B, an entry 62 includes client IP address 71, client MAC address 73, interface ID 75 (e.g., identifying the logical and/or physical interface 22 via which messages sent by the client are received into the switch that includes binding table 70), VLAN (Virtual Local Area Network) ID 77 (identifying a VLAN in which the client to which entry 62 corresponds sends protocol messages), and lease time 79. The information illustrated as being included in binding table 70 is merely an example. In other embodiments, different information can be included in a binding table in addition to and/or instead of the information shown in FIG. 8C.

Client IP address 71 may have been generated by protocol server 16 (in this example, a DHCP server) of FIGS. 4 and 7. Snooping agent 50 obtains client IP address 71 from a protocol message being sent from protocol server 16 to a particular protocol client 12 and stores client IP address 71 in a binding table entry corresponding to that protocol client. Lease time 79 is a value representing the length of time that client IP address 71 may be used by the client to which that IP address is assigned. Snooping agent 50 also obtains this information from the DHCP server reply assigning the IP address to the client.

Snooping agent 50 can obtain other information for storage in binding table 70 from protocol messages generated by clients 12. For example, snooping agent 50 may allocate a binding table entry 62 to a particular client in response to intercepting a DHCP request from that client requesting an IP address from a DHCP server. Snooping agent 50 can obtain client MAC address 73, interface ID 75, and/or VLAN ID 77 from the DHCP request and store this information in the allocated binding table entry.

In one embodiment in which DHCP messages are being intercepted, snooping agent 50 responds to a DHCP ACK message (sent from a DHCP server to a DHCP client to assign an IP address to that client) by allocating an entry 62 in binding table 70 to the DHCP client, if such an entry does not already exist. In response to a DHCP NAK message (sent from a DHCP server to a DHCP client to deny assigning an IP address to that client), snooping agent 50 deletes an existing binding table entry (if any) corresponding to that client. A DHCP NAK message is sent when a client attempts to reuse an IP address and the DHCP server determines that the IP address is not applicable to the client (e.g., because the client has moved to a new subnet). Similarly, in response to a DHCP RELEASE message (sent from a client to a DHCP server to relinquish an IP address assigned to that client), snooping agent 50 deletes an existing binding table entry corresponding to that client. If a DHCP DECLINE message (sent from a client to a DHCP server in response to the client discovering that an IP address is already assigned to another device) is received, snooping agent 50 deletes an existing binding table entry (if any) corresponding to that client.

Generally, snooping agent 50 stores various information, such as an IP address, identifying a network service provided by a protocol server to a protocol client in a binding table entry associated with a particular client. Snooping agent 50 can also store other information identifying that client, such as a client MAC address and an interface ID, in the binding table entry. Snooping agent 50 may use this information to verify subsequent protocol messages. For example, snooping agent 50 can verify the sender of a particular protocol message by comparing the source IP address, MAC address, and interface ID in a particular message with the information stored in binding table 70. If no entry 62 in binding table 70 includes the same combination of source IP address, MAC address, and interface ID, snooping agent 50 determines that the protocol message was not sent by the client identified as the sender and, in response to that determination, drop the protocol message.

A binding table 70 can also be used to store information, such as lease time 79, indicating how network services provided by a particular protocol are to be used. Snooping agent 50 may use this information to verify that network services (e.g., IP addresses) are being used in a manner that is consistent with the protocol. For example, using lease time information 79, snooping agent 50 can examine intercepted protocol messages to determine whether a client is attempting to use an IP address for longer than the client is allowed. If a protocol violation is detected (e.g., if a message sent by a client having a particular IP address is received subsequent to the expiration of the lease time associated with that IP address in the binding table) in a particular message, snooping agent 50 drops that message.

In some embodiments, binding table 70 is implemented as a hash table. To access a binding table entry associated with a particular client, information such as the client's MAC address and VLAN ID is used as a hash key.

Figure 9:
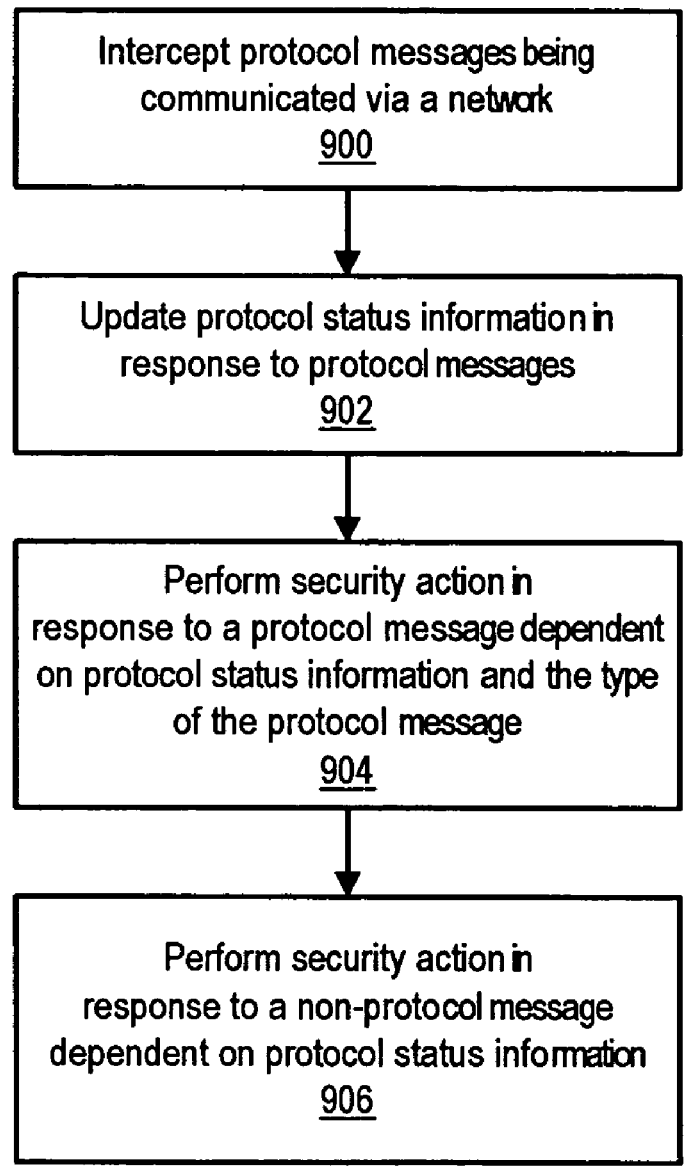
FIG. 9 is a flowchart illustrating one embodiment of a method of snooping protocol messages in order to update protocol status information and to perform security actions dependent on the protocol status information.

FIG. 9 is a flowchart illustrating one embodiment of a method of snooping protocol messages in order to update protocol status information and to perform security actions dependent on the protocol status information. At 900, one or more protocol messages being communicated via a network are intercepted by a network device. The protocol messages are included in a stream of messages input to the network device. In some embodiments, the network device may detect protocol messages based on a server port indicated in the protocol messages.

In response to the intercepted protocol messages, the network device updates protocol status information, as indicated at 902. The protocol status information includes both information included in the protocol messages and information indicative of how the protocol messages are conveyed from one or more protocol clients to the network. For example, in response to receiving a protocol message sent by a protocol client to request a network service, the network device can store information indicating that the protocol request was received via a particular logical and/or physical interface of the network device. The network device can store information indicating that the protocol client has an outstanding protocol request. The network device can also store information included in the protocol request that identifies the client device (e.g., a VLAN ID and/or MAC address). Similarly, in response to a protocol message sent by a protocol server to provide a network service to a client, the network device stores information identifying the network service (e.g., an IP address), the client to which that service is being provided, and/or information (e.g., a lease time) indicating how the client may use the service. The protocol status information can also include information indicative of the rate at which protocol messages are being received from a particular client or group of clients or via a particular interface or group of interfaces.

The network device then uses the protocol status information updated at 902 to determine whether to perform security actions for subsequently received messages. As indicated at 904, the network device performs a security action for a subsequent protocol message dependent on the protocol status information and the type (e.g., client request, server response, and the like) of the subsequent protocol message. Security actions include dropping the protocol message if it includes information that is inconsistent with the protocol status information, updating information included in the protocol message, and/or updating an error log. Note that the network device can also update the protocol status information in response to the subsequently received protocol message.

In some embodiments, the network device also uses the protocol status information to determine whether to perform security actions in response to non-protocol messages, as indicated at 906. For example, a network device may receive, via one of the network device's interfaces, a message containing information indicating that it was sent by a client having a certain IP address, assigned using the network protocol. The network device can verify whether the protocol server assigned that IP address to a client that sends messages to the network via that interface of the network device. If the protocol status information indicates that the client assigned that IP address sends messages to the network via another interface of the network device, or that no client has been assigned that IP address, the network device performs a security action such as dropping the message and/or updating an error log. If the protocol status information instead indicates that the client assigned that IP address does convey messages to the network via that interface of the network device, the network device may allow the message to continue its progress through the network.

Figure 10A:
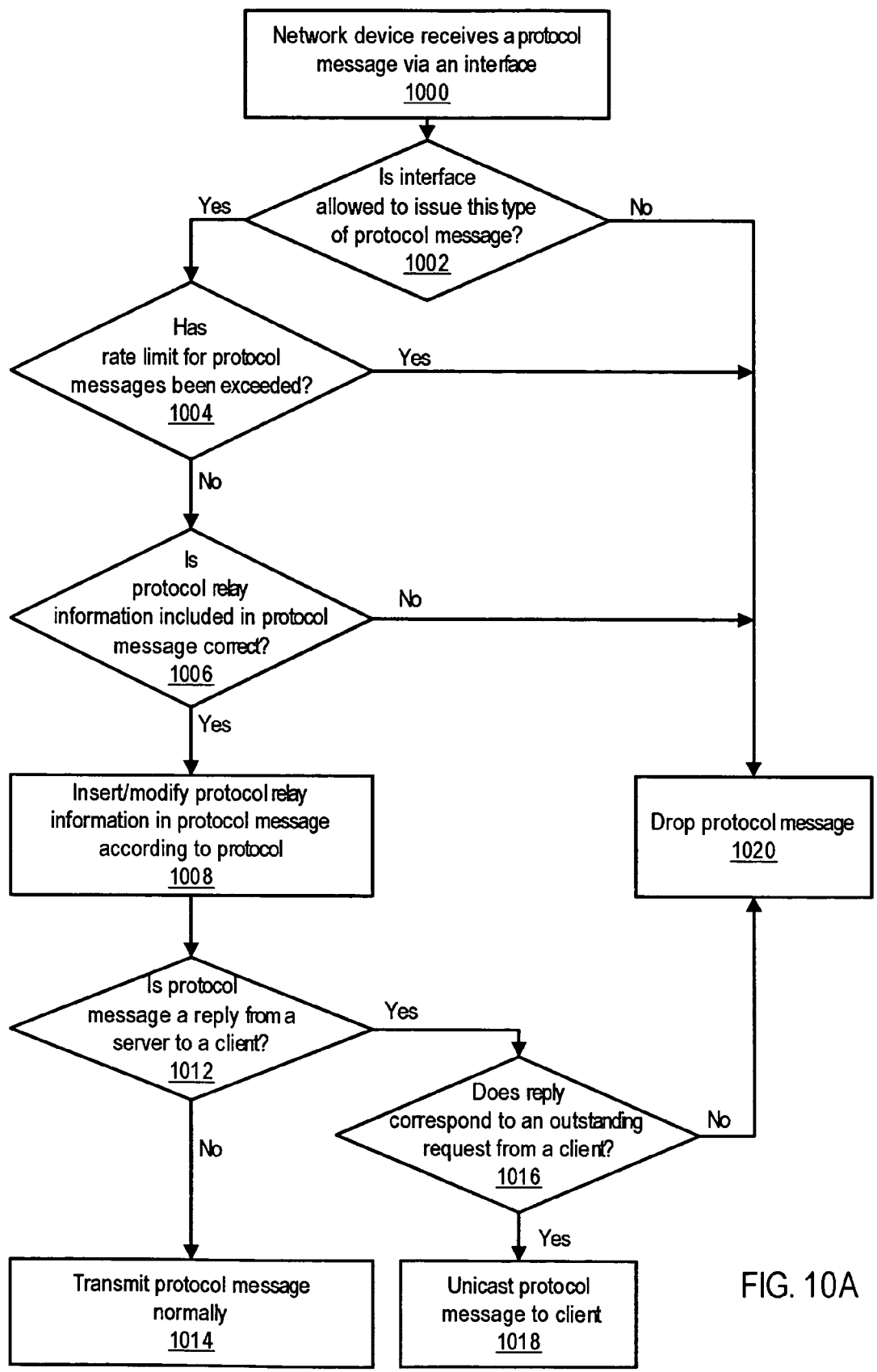
FIG. 10A is a flowchart illustrating various security actions that can be performed dependent upon protocol status information, according to one embodiment.

FIG. 10A is a flowchart illustrating various security actions that can be performed dependent upon protocol status information. In this embodiment, a network device receives a protocol message via a particular logical and/or physical interface, as indicated at 1000. Based on protocol status information maintained by that network device, the network device determines whether the interface that received the protocol message is allowed to issue that type of protocol message, as shown at 1002. If the interface is not allowed to issue that type of protocol message (e.g., if the interface is not coupled to receive messages from a protocol server, and if the message is of a type that is only allowed to be sent by a protocol server), the network device drops the message, as shown at 1020. Otherwise, the network device proceeds to further verify the protocol message at 1004.

As indicated at 1004, the network device verifies whether a rate limit for protocol messages has been exceeded. If so, the network device drops the protocol message, as shown at 1020. The rate of protocol messages can be limited on a per interface (or group of interfaces) and/or a per client (or group of clients) basis in some embodiments.

At 1006, the network device verifies whether protocol relay information (if any) included in the protocol message is correct. For example, if the protocol message is a DHCP message, the network device can check to see if another network device has inserted relay information into the protocol message. If so, the network device determines whether the protocol relay information is correct, based on information indicative of the interface via which the message was received.

If the protocol relay information (if any) in the protocol message is correct, the network device can modify or add protocol relay information to the protocol message, as indicated at 1008. For example, if no protocol relay information is included in the protocol message (e.g., because this network device is the first network device allowed to add relay information to handle the protocol message), the network device adds protocol relay information to the protocol message. Alternatively, if the network device is outputting the protocol message to a client or server (as opposed to another network device), the network device removes any protocol relay information already included in the message.

If the protocol message is a type of message (e.g., a protocol reply such as a DHCP ACK or DHCP NAK) sent by a protocol server, as determined at 1012, the network device accesses the protocol status information to determine whether the protocol message corresponds to an outstanding protocol request from a client, as shown at 1016. If the protocol message does not correspond to an outstanding request, the network device drops the protocol message, as shown at 1020. Otherwise, the network device unicasts the protocol message to the destination client so that no other clients receive the protocol message, as indicated at 1018. If the protocol message is not a type of message sent by a protocol server, the network device transmits the protocol message normally (e.g., if the protocol message is identified as a message that should be flooded or multicast, the network device will appropriately flood or multicast the protocol message), as shown at 1014.

Figure 10B:
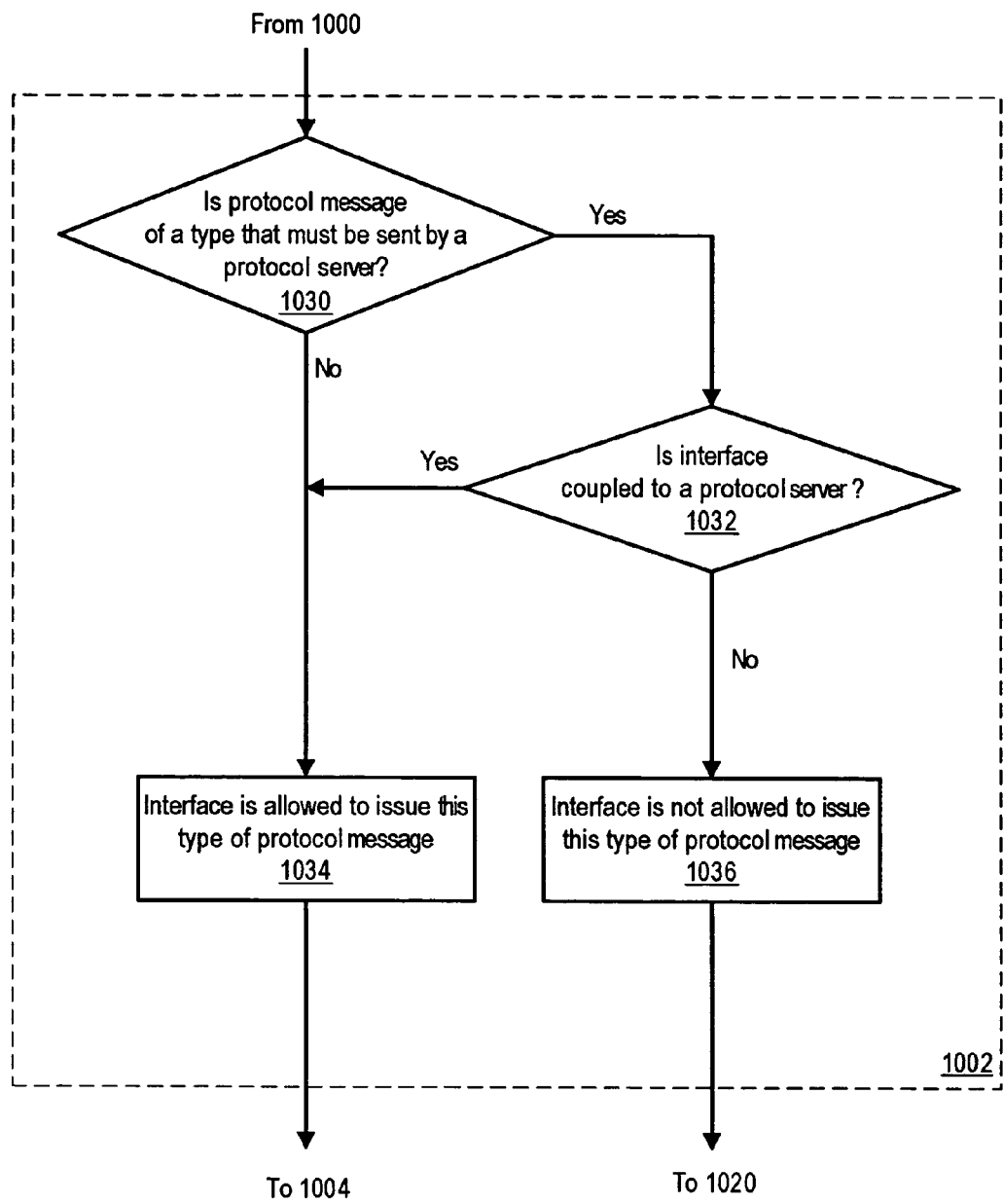
FIG. 10B is a flowchart illustrating additional details of how protocol status information is used to verify protocol messages in the embodiment of FIG. 10A.

FIG. 10B is a flowchart illustrating additional details of how protocol status information is used to verify that a particular interface is allowed to issue a particular type of protocol messages in the embodiment of FIG. 10A. At 1030, the network device determines whether the protocol message is of a type that must be sent by a protocol server. For example, if the protocol message is a DHCP message, the network device identifies messages of types DHCP OFFER, DHCP ACK, and DHCP NAK as messages that only a DHCP server is allowed to send. If the protocol message is of a type that is not required to be sent by a protocol server, the network device determines that the interface is allowed to issue this type of protocol message, as shown at 1034. Note that in some embodiments, if the protocol message is of a type that may only be sent by a protocol client, the network device additionally verifies whether there are any protocol clients coupled to send messages via that interface before reaching the determination at 1034.

If the protocol message is of a type that can only be sent by a protocol server, the network device accesses protocol status information to determine whether the interface via which the protocol message was received into the network device is coupled to receive messages from a protocol server, as shown at 1032. If the protocol status information indicates that a protocol server is coupled to that interface, then the network device determines that the interface is allowed to issue that type of protocol message. Otherwise, the network device determines that the interface is not allowed to issue that type of protocol message, as indicated at 1036. In response, the protocol message is dropped, as shown at 1020 of FIG. 10A.

Figure 11:
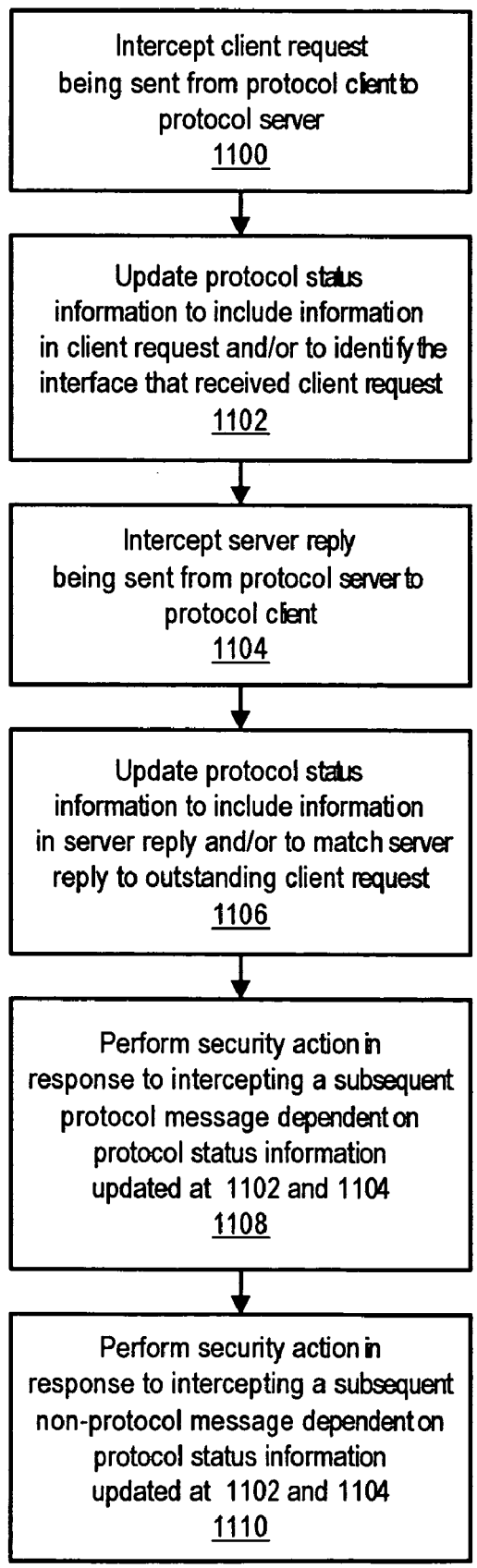
FIG. 11 is a flowchart illustrating how protocol status information is obtained by intercepting a protocol request from a protocol client and a protocol reply from a protocol server and how this protocol status information is then used to verify other protocol messages, according to one embodiment.

FIG. 11 is a flowchart illustrating how protocol status information is obtained from intercepting a protocol request from a protocol client and a protocol reply from a protocol server and how this protocol status information is then used to verify other protocol messages, according to one embodiment. At 1100, a protocol message is intercepted. The protocol message contains a client request for network services that is being sent from a protocol client to a protocol client via a network. In response to the intercepted client request protocol message, protocol status information is updated at 1102 to include information in the protocol message and/or to identify the interface that received the client request. The protocol status information can also be updated to indicate that the protocol client has an outstanding protocol request.

At 1104, a protocol message that contains a protocol server reply is intercepted as the protocol message is being sent from the protocol server to the protocol client. In response, the protocol status information is updated at 1106 to include information in the server reply and/or to match the server reply to the outstanding client request intercepted at 1100.

Dependent upon the protocol status information updated at 1102 and 1106, a security action is performed at 1108 in response to intercepting a subsequent protocol message. A security action can involve dropping the subsequent protocol message or logging an error. For example, the protocol status information can be used to verify the identity of the sender of the subsequent protocol message, or to determine that a preset rate limit of protocol messages has not been exceeded. Note that the protocol status information can also be updated in response to the subsequent protocol message. In some embodiments, the protocol status information updated at 1102 and 1106 is also used to determine whether to perform a security action in response to intercepting a subsequent non-protocol message, as indicated at 1110.

Although the present invention has been described with respect to specific embodiments thereof, various changes and modifications may be suggested to one skilled in the art. It is intended such changes and modifications fall within the scope of the appended claims.

What is claimed is:

1. A method comprising:
   receiving user input specifying an Inter-Layer Binding Protocol (ILBP) rate for a first interface;
   detecting a rate of ILBP messages received via the first interface;
   dropping an ILBP message received via the first interface, if the rate exceeds the ILBP rate specified by the user input;
   validating the ILBP message received via the first interface, if the rate does not exceed the ILBP rate;
   dropping the ILBP message if the ILBP message is invalid; and
   generating protocol status information, in response to one or more Dynamic Host Configuration Protocol (DHCP) messages, wherein
   the one or more DHCP messages are conveyed according to a protocol used to assign network addresses to clients,
   a body of the ILBP message comprises an inter-layer binding,
   the validating the ILBP message comprises comparing the inter-layer binding to the protocol status information, and
   the protocol status information comprises an Internet Protocol (IP) address and a Media Access Control (MAC) address.

2. The method of claim 1, further comprising:
   inhibiting an update of an ILBP cache in response to the ILBP message, unless the inter-layer binding matches the protocol status information.

3. The method of claim 1, wherein
   the validating the ILBP message is performed in response to ILBP configuration information, and
   the ILBP configuration information identifies that ILBP validation is enabled for a first Virtual Local Area Network (VLAN).

4. The method of claim 3, wherein
   the first interface is an isolated interface in a second VLAN,
   the second VLAN is a secondary VLAN implementing a private VLAN, and
   the first VLAN is a primary VLAN.

5. The method of claim 4, wherein
   second ILBP configuration information indicates that ILBP validation is disabled for the second VLAN.

6. The method of claim 1, wherein
   the ILBP rate is lower than a default ILBP rate.

7. The method of claim 1, wherein
   the ILBP rate is higher than a default ILBP rate.

8. The method of claim 1, wherein
   a set of one or more trusted interfaces comprises the first interface.

9. The method of claim 8, further comprising:
   detecting a second rate of ILBP messages received via a second interface; and
   dropping a second ILBP message received via the second interface, in response to the second rate exceeding a default rate, wherein the second interface is not one of the one or more trusted interfaces, and no user input specifying a second ILBP rate for the second interface has been received.

10. The method of claim 9, further comprising:
inhibiting rate-limiting of ILBP messages received via a third interface, wherein
the set of one or more trusted interfaces comprises the third interface, and
no user input specifying a third ILBP rate for the third interface has been received.

11. The method of claim 1, wherein
the comparing the inter-layer binding to the protocol status information comprises comparing the inter-layer binding to information in each of a plurality of binding table entries,
each of the plurality of binding table entries are associated with a first VLAN, and
the ILBP message is conveyed via the first VLAN.

12. A network device comprising:
an Inter-Layer Binding Protocol (ILBP) rate-limiting module;
rate-limit storage coupled to the rate-limiting module, wherein
the rate-limit storage is configured to store a user-specified rate, in response to user input specifying the user-specified rate, and
the ILBP rate-limiting module is configured to drop an ILBP message if a rate of ILBP messages received via a first interface exceeds the user-specified rate; and
an ILBP security agent coupled to the first interface, wherein
the ILBP security agent is configured to validate the ILBP message, if the ILBP message is not dropped by the ILBP rate-limiting module, and
the ILBP security agent is configured to drop the ILBP message in response to detecting that the ILBP message is invalid.

13. The network device of claim 12, wherein
the rate-limit storage is configured to store a default rate, if no user input specifying the user-specified rate has been received, and
the ILBP rate-limiting module is configured to drop the ILBP message in response to:
the rate of ILBP messages received via the first interface exceeding the default rate, and
the first interface being configured as one of one or more untrusted interfaces.

14. The network device of claim 13, wherein
the first interface comprises the ILBP rate-limiting module.

15. The network device of claim 12, further comprising:
a snooping agent, wherein
the snooping agent is configured to generate protocol status information, in response to one or more protocol messages,
the one or more protocol messages are conveyed according to a protocol used to assign network addresses to clients,
a body of the ILBP message comprises an inter-layer binding, and
the ILBP security agent is configured to compare the inter-layer binding to the protocol status information.

16. The network device of claim 15, wherein
the ILBP security agent is configured to validate the ILBP message in response to ILBP configuration information, and the ILBP configuration information identifies that ILBP validation is enabled for a first Virtual Local Area Network (VLAN).

17. The network device of claim 16, wherein
the first interface is an isolated interface in a second VLAN,
the second VLAN is a secondary VLAN implementing a private VLAN, and
the first VLAN is a primary VLAN.

18. The network device of claim 17, wherein
second ILBP configuration information indicates that ILBP validation is disabled for the second VLAN.

19. The network device of claim 15, wherein
the protocol status information comprises an Internet Protocol (IP) address and a Media Access Control (MAC) address, and
the snooping agent is configured to generate the protocol status information in response to one or more Dynamic Host Configuration Protocol (DHCP) messages.

20. The network device of claim 19, wherein
the ILBP security agent is configured to compare the inter-layer binding to information in each of a plurality of binding table entries,
each of the plurality of binding table entries are associated with a first VLAN, and
the ILBP message is conveyed via the first VLAN.

21. A system comprising:
means for receiving user input specifying an Inter-Layer Binding Protocol (ILBP) rate for a first interface;
means for detecting a rate of ILBP messages received via the first interface; and
means for dropping an ILBP message received via the first interface, if the rate exceeds the ILBP rate specified by the user input;
means for validating the ILBP message received via the first interface, if the rate does not exceed the ILBP rate;
means for dropping the ILBP message if the ILBP message is invalid; and
means for generating protocol status information, in response to one or more Dynamic Host Configuration Protocol (DHCP) messages, wherein
the one or more DHCP messages are conveyed according to a protocol used to assign network addresses to clients,
a body of the ILBP message comprises an inter-layer binding,
validation of the ILBP message comprises comparing the inter-layer binding to the protocol status information, and
the protocol status information comprises an Internet Protocol (IP) address and a Media Access Control (MAC) address.

22. The system of claim 21, further comprising:
means for inhibiting an update of an ILBP cache in response to the ILBP message, unless the inter-layer binding matches the protocol status information.

23. The system of claim 21, wherein
the ILBP message is validated in response to ILBP configuration information, and
the ILBP configuration information identifies that ILBP validation is enabled for a first Virtual Local Area Network (VLAN).

24. The system of claim 23, wherein
the first interface is an isolated interface in a second VLAN,
the second VLAN is a secondary VLAN implementing a private VLAN, and
the first VLAN is a primary VLAN.

25. The system of claim 24, wherein
second ILBP configuration information indicates that ILBP validation is disabled for the second VLAN.

26. The system of claim 21, wherein
the ILBP rate is lower than a default ILBP rate.

27. The system of claim 21, wherein
the ILBP rate is higher than a default ILBP rate.

28. The system of claim 21, wherein
a set of one or more trusted interfaces comprises the first interface.

29. The system of claim 28, further comprising:
means for detecting a second rate of ILBP messages received via a second interface; and
means for dropping a second ILBP message received via the second interface, in response to the second rate exceeding a default rate, wherein
the second interface is not one of the one or more trusted interfaces, and
no user input specifying a second ILBP rate for the second interface has been received.

30. The system of claim 29, further comprising:
means for inhibiting rate-limiting of ILBP messages received via a third interface, wherein
the set of one or more trusted interfaces comprises the third interface, and
no user input specifying a third ILBP rate for the third interface has been received.

31. The system of claim 21, wherein
comparing the inter-layer binding to the protocol status information comprises comparing the inter-layer binding to information in each of a plurality of binding table entries,
each of the plurality of binding table entries are associated with a first VLAN, and
the ILBP message is conveyed via the first VLAN.

32. A computer readable medium comprising program instructions executable to:
receive user input specifying an Inter-Layer Binding Protocol (ILBP) rate for a first interface;
detect a rate of ILBP messages received via the first interface;
drop an ILBP message received via the first interface, if the rate exceeds the ILBP rate specified by the user input;
validate the ILBP message received via the first interface, if the rate does not exceed the ILBP rate;
drop the ILBP message if the ILBP message is invalid; and
generate protocol status information, in response to one or more Dynamic Host Configuration Protocol (DHCP) messages, wherein
the protocol status information comprises an Internet Protocol (IP) address and a Media Access Control (MAC) address,
the one or more DHCP messages are conveyed according to a protocol used to assign network addresses to clients,
a body of the ILBP message comprises an inter-layer binding, and
validation of the ILBP message comprises comparing the inter-layer binding to the protocol status information.

33. The computer readable medium of claim 32, wherein the program instructions are further executable to:
inhibit an update of an ILBP cache in response to the ILBP message, unless the inter-layer binding matches the protocol status information.

34. The computer readable medium of claim 32, wherein
the ILBP message is validated in response to ILBP configuration information, and
the ILBP configuration information identifies that ILBP validation is enabled for a first Virtual Local Area Network (VLAN).

35. The computer readable medium of claim 34, wherein
the first interface is an isolated interface in a second VLAN,
the second VLAN is a secondary VLAN implementing a private VLAN, and
the first VLAN is a primary VLAN.

36. The computer readable medium of claim 35, wherein
second ILBP configuration information indicates that ILBP validation is disabled for the second VLAN.

37. The computer readable medium of claim 32, wherein
the ILBP rate is lower than a default ILBP rate.

38. The computer readable medium of claim 32, wherein
the ILBP rate is higher than a default ILBP rate.

39. The computer readable medium of claim 32, wherein
a set of one or more trusted interfaces comprises the first interface.

40. The computer readable medium of claim 39, wherein the program instructions are further executable to:
detect a second rate of ILBP messages received via a second interface; and
drop a second ILBP message received via the second interface, in response to the second rate exceeding a default rate, wherein
the second interface is not one of the one or more trusted interfaces, and
no user input specifying a second ILBP rate for the second interface has been received.

41. The computer readable medium of claim 40, wherein the program instructions are further executable to:
inhibit rate-limiting of ILBP messages received via a third interface, wherein
the set of one or more trusted interfaces comprises the third interface, and
no user input specifying a third ILBP rate for the third interface has been received.

42. The computer readable medium of claim 32, wherein
comparing the inter-layer binding to the protocol status information comprises
comparing the inter-layer binding to information in each of a plurality of binding table entries,
each of the plurality of binding table entries are associated with a first VLAN, and
the ILBP message is conveyed via the first VLAN.

* * * * *